US012542788B2

(12) United States Patent
Mitra et al.

(10) Patent No.: US 12,542,788 B2
(45) Date of Patent: Feb. 3, 2026

(54) DEEP LEARNING BASED SYSTEM AND METHOD FOR INLINE NETWORK ANALYSIS

(71) Applicant: Avago Technologies International Sales Pte. Limited, Singapore (SG)

(72) Inventors: Bhaswar Mitra, Santa Clara, CA (US); Nitin Vinay Isloorkar, Santa Clara, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 227 days.

(21) Appl. No.: 17/586,088

(22) Filed: Jan. 27, 2022

(65) Prior Publication Data
US 2023/0239310 A1 Jul. 27, 2023

(51) Int. Cl.
*H04L 29/06* (2006.01)
*G06N 3/10* (2006.01)
(Continued)

(52) U.S. Cl.
CPC .......... *H04L 63/1416* (2013.01); *G06N 3/10* (2013.01); *H04L 41/145* (2013.01); *H04L 41/16* (2013.01)

(58) Field of Classification Search
CPC ... H04L 63/1416; H04L 41/145; H04L 41/16; H04L 43/026; H04L 41/0843;
(Continued)

(56) References Cited

U.S. PATENT DOCUMENTS

| 10,645,100 B1 | 5/2020 | Wang et al. |
| 2010/0034109 A1 | 2/2010 | Shomura et al. |

(Continued)

FOREIGN PATENT DOCUMENTS

| CN | 111247533 A | 6/2020 |
| CN | 112181358 A | 1/2021 |
| CN | 113255819 A | 8/2021 |

OTHER PUBLICATIONS

Non-Final Office Action on U.S. Appl. No. 17/586,065 Dtd Feb. 27, 2023.
(Continued)

*Primary Examiner* — Joseph P Hirl
*Assistant Examiner* — Leynna Truvan
(74) *Attorney, Agent, or Firm* — Foley & Lardner LLP

(57) ABSTRACT

Described herein are a device and a method for performing a network analysis. In one aspect, the device includes a reconfigurable neural network circuit to determine an indication of a predicted network characteristic. In one aspect, the reconfigurable neural network circuit includes a control circuit to select a packet attribute or a flow attribute of a raw packet stream from a pipeline, and determine a configuration setting corresponding to the packet attribute or the flow attribute. The configuration setting may indicate a configuration of the reconfigurable neural network circuit to implement a neural network. In one aspect, the reconfigurable neural network circuit includes a storage to provide neural network parameters of the neural network, according to the configuration setting. In one aspect, the reconfigurable neural network circuit includes computational circuits to perform computations based on the neural network parameters from the storage to determine the indication of the predicted network characteristic.

20 Claims, 13 Drawing Sheets

(51) Int. Cl.
*H04L 9/40* (2022.01)
*H04L 41/14* (2022.01)
*H04L 41/16* (2022.01)

(58) Field of Classification Search
CPC . H04L 41/0897; H04L 41/142; H04L 41/147; H04L 41/14; H04L 41/0823; H04L 25/03165; H04L 45/08; H04L 2012/5686; H04L 2025/03464; H04L 9/3213; H04L 12/40071; H04L 45/26; H04L 45/566; H04L 47/35; H04L 47/10; H04L 45/38; G06N 3/10; G06N 2207/4824; G06N 3/02; G06N 3/049; B23K 31/006; B25J 91/161; B29C 2945/76979; B60G 2600/1878; B60N 2220/30; B60T 2210/122; B64G 1/247; B65H 2557/38; G01N 29/4481; G01N 33/0034; G01N 2201/1296; G01N 2035/00881; G01S 7/417; G05B 13/029; G05B 23/024; G05B 23/0254; G05B 23/0281; G05B 2219/25255; G05B 2219/21002; G05B 2219/32193; G05B 2219/33024; G05B 2219/33027; G05B 2219/40529; G05B 2219/41054; G05B 2219/25065; G05B 2219/25124; G06T 3/4046; G06T 9/002; G06T 2207/20084; G06T 2211/441; G06T 5/60; G06V 10/82; G10K 2210/3038; G10K 15/16; G10L 25/30; G10L 15/16; G11B 20/10518; H01M 8/04992; H02P 21/0014; H03H 2017/0208; H04B 17/3913; H04Q 2213/13343; H04Q 2213/343; F02D 41/1405; F03D 17/005; F05D 2270/709; F16H 2061/0084; G06F 11/1476; G06F 11/2263; G06F 3/027; G06F 2207/4824; H04M 15/8214; H04M 2215/782; H04N 1/00217; H04N 21/238; H04N 21/262; H04N 21/26216; H04N 21/4621; H04W 12/106; G08B 25/007

See application file for complete search history.

(56) References Cited

U.S. PATENT DOCUMENTS

| | | |
|---|---|---|
| 2012/0233349 A1 | 9/2012 | Aybay |
| 2017/0093648 A1 | 3/2017 | Elarabawy |
| 2018/0278500 A1* | 9/2018 | Feamster ............... H04L 43/20 |
| 2019/0042602 A1 | 2/2019 | Wang et al. |
| 2019/0171187 A1* | 6/2019 | Cella .................... G06N 3/126 |
| 2020/0036611 A1 | 1/2020 | Lu et al. |
| 2020/0264876 A1* | 8/2020 | Lo ...................... G06F 9/30025 |
| 2020/0387800 A1 | 12/2020 | Du et al. |
| 2021/0158151 A1 | 5/2021 | Wang et al. |
| 2022/0255897 A1 | 8/2022 | Miele et al. |

OTHER PUBLICATIONS

Extended European Search Report Application No. EP 22215801.6-1216 dated Jun. 19, 2023.

Extended European Search Report application No. EP 22215879.2-1216 dated Jun. 19, 2023.

CN Office Action on CN Appln. No 202211657132.2 dated Feb. 19, 2025.

\* cited by examiner ns and methods
for performing network analysis.

DEEP LEARNING BASED SYSTEM AND METHOD FOR INLINE NETWORK ANALYSIS

FIELD OF THE DISCLOSURE

This disclosure generally relates to systems and methods for performing network analysis.

BACKGROUND

Various approaches for implementing a deep learning technique based on a neural network to determine a network characteristic or a network condition have been proposed. For example, a neural network may be applied to application classification, anomaly detection, congestion handling and intrusion detection (DDoS detection etc.) based on flow statistics. In one implementation, a large number of packets (e.g., over 10,000 packets) at the end of the flow can be applied to the neural network to determine a network characteristic or a network condition. However, such implementation based on the end of the flow with a large number of packets may be inappropriate for a real time analysis. For example, detecting a network intrusion based on a large number of packets may be too late, and may not allow an adequate network protection in time.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for inline network analysis.

A. Computing and Network Environment

Figure 1A:
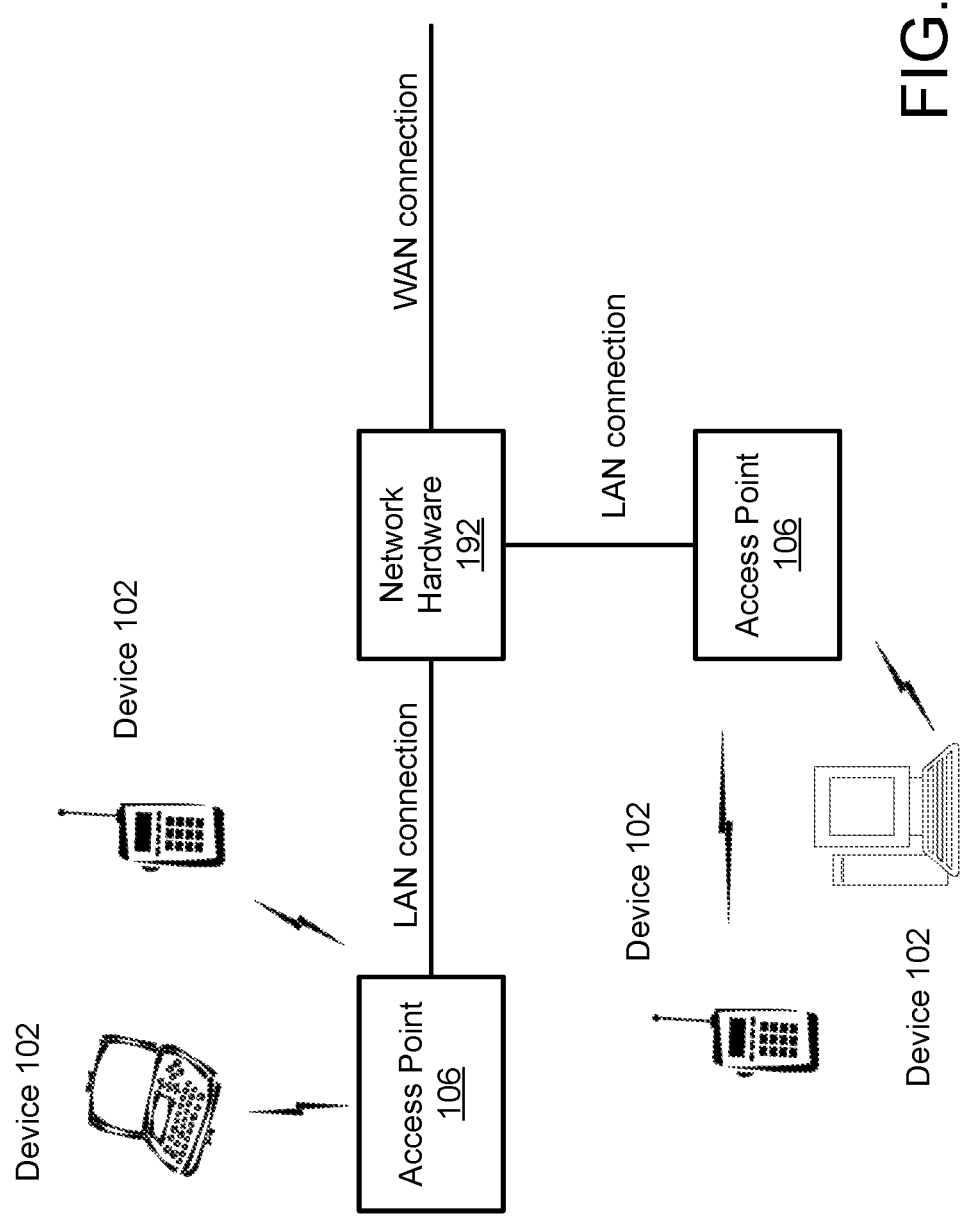
FIG. 1A is a block diagram depicting a network environment including one or more access points in communication with one or more devices or stations, according to some embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc., in one embodiment. The APs 106 can be operably coupled to the network hardware 192 via local area network connections. The network hardware 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as a wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, and a computer network. The topology of the network can be a bus, star, or ring network topology. The network can be of any such network topology capable of supporting the operations described herein. In some embodiments, different types of data can be transmitted via different protocols. In other embodiments, the same types of data can be transmitted via different protocols.

Figure 1B:
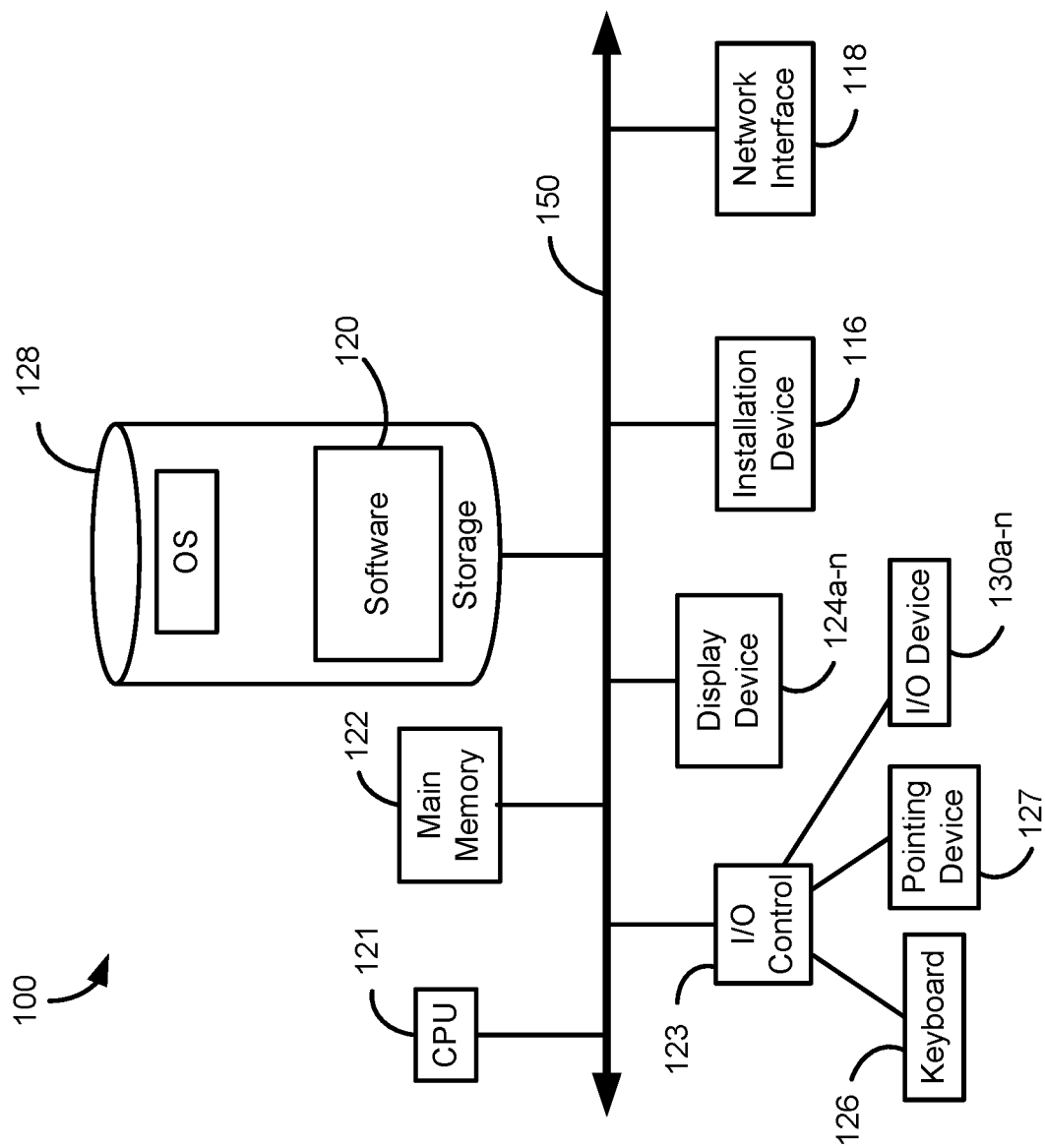
FIGS. 1B and 1C are block diagrams depicting computing devices useful in connection with the methods and systems described herein, according to some embodiments.
Figure 1C:
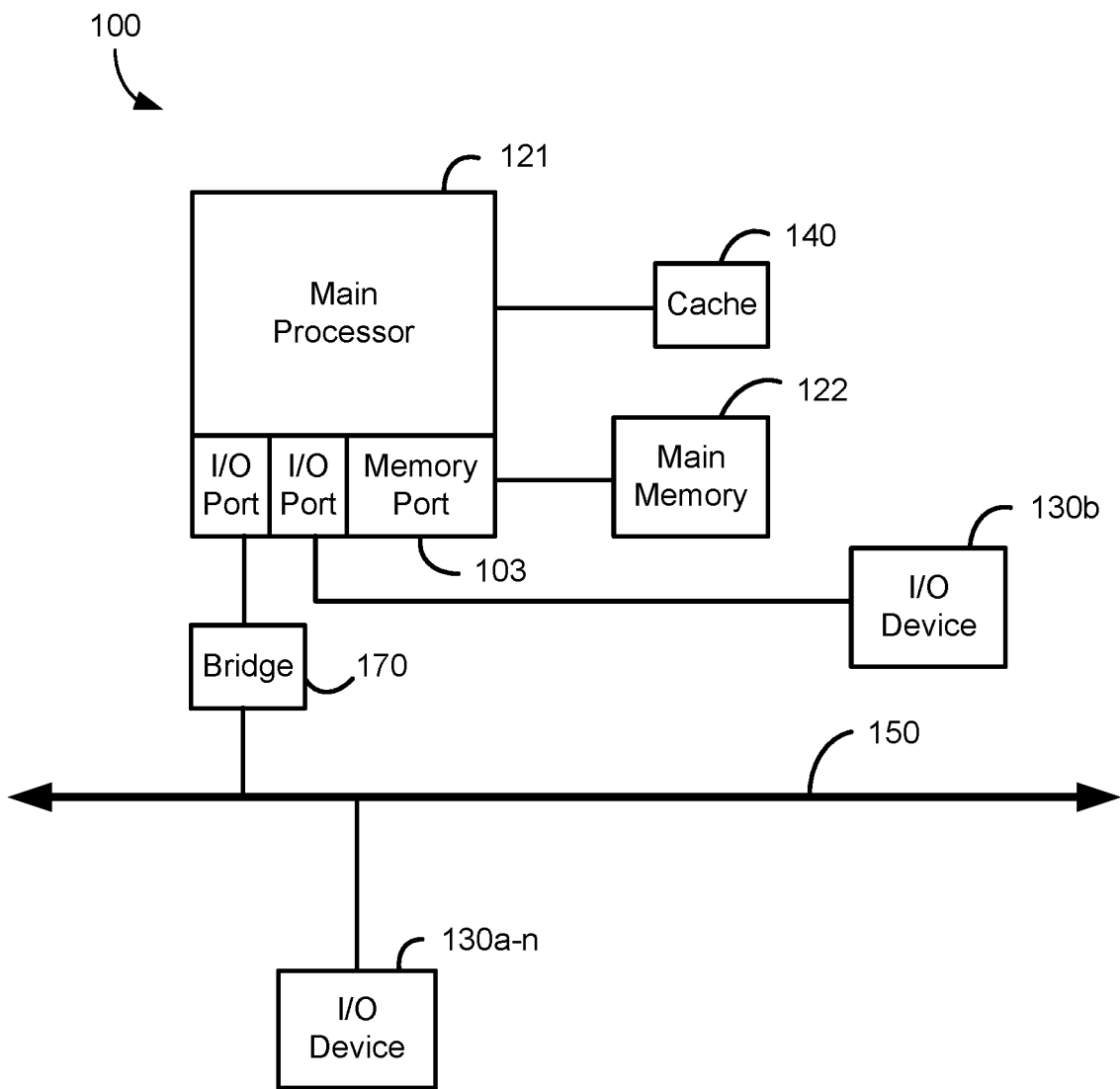

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126, and a pointing device 127 such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more 110 devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.1 in, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7-11, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Systems and Methods for Inline Network Analysis

Described herein are systems (or devices) and methods for performing or predicting network analysis at a line rate. In one aspect, a network device includes a reconfigurable neural network circuit to determine an indication of a predicted network characteristic. A predicted network characteristic may be network anomaly, network intrusion, predicted congestion, or a configuration value for a traffic manager to improve a QoS (e.g., reduce dropped packets). In one aspect, the reconfigurable neural network circuit includes a set of computational circuits configured to perform computations according to neural network parameters of a neural network to determine the indication of the predicted network characteristic. The neural network parameters may be weights, biases, quantization parameters, a stride size, a pooling size, a type of activation function, etc. In one aspect, the reconfigurable neural network circuit includes a controller to determine a configuration setting corresponding to a packet attribute or a flow attribute of a raw packet stream. Examples of a packet attribute include a packet source, a packet destination, a traffic class, or a flag. Examples of a flow attribute include identification protocol, a total bytes in the flow up to a current packet, a flag counts within the flow, table look up results, indication of whether or not a flow is an elephant flow, or any flow attribute computed by a stateful pipe component. The configuration setting may indicate a configuration of the reconfigurable neural network circuit to implement the neural network. The reconfigurable neural network circuit may include a storage to provide the neural network parameters of the neural network to the set of computational circuits, according to the configuration setting. Accordingly, different neural networks can be adaptively implemented for different packets to perform different network analyses.

In one aspect, a network device can be implemented as a linear feedforward packet processing pipeline capable of performing per-packet inference (or computation) on packets processed by the pipeline. Packets can be streamed into, and out of, the network device or the reconfigurable neural network circuit at a rate of one packet per clock cycle. Recirculation may be provided locally with corresponding non-linear degradation of processing bandwidth.

In one aspect, a network device can perform feature computation, scaling and imputation, and post processing per packet, according to the packet attribute or the flow attribute. In one aspect, the feature computation, scaling and imputation, neural network computation, and post processing can be performed based on one or more tables. Each table may include a list of indexes to be applied for a subsequent table or identifying configuration settings for corresponding packet attributes or flow attributes. For example, a packet attribute of a first packet may correspond to a first entry of a table, and a second attribute of a second packet may correspond to a second entry of the table. Hence, different configuration settings of various components of the network device can be selected for different packets, thereby allowing different analyses or computations to be adaptively performed on different packets. For example, different analyses or computations for application classification, intrusion detection, or congestion prediction can be performed for different packets.

Advantageously, the disclosed device can perform computations based on one or more neural networks in real time or at line rate. For example, the disclosed device can implement different neural networks and perform computations for the different neural networks in pipeline for at rates of the order of billions of packets per second (Bpps), and achieve processing power in the order of trillions of operations per second (TOPS).

Figure 2:
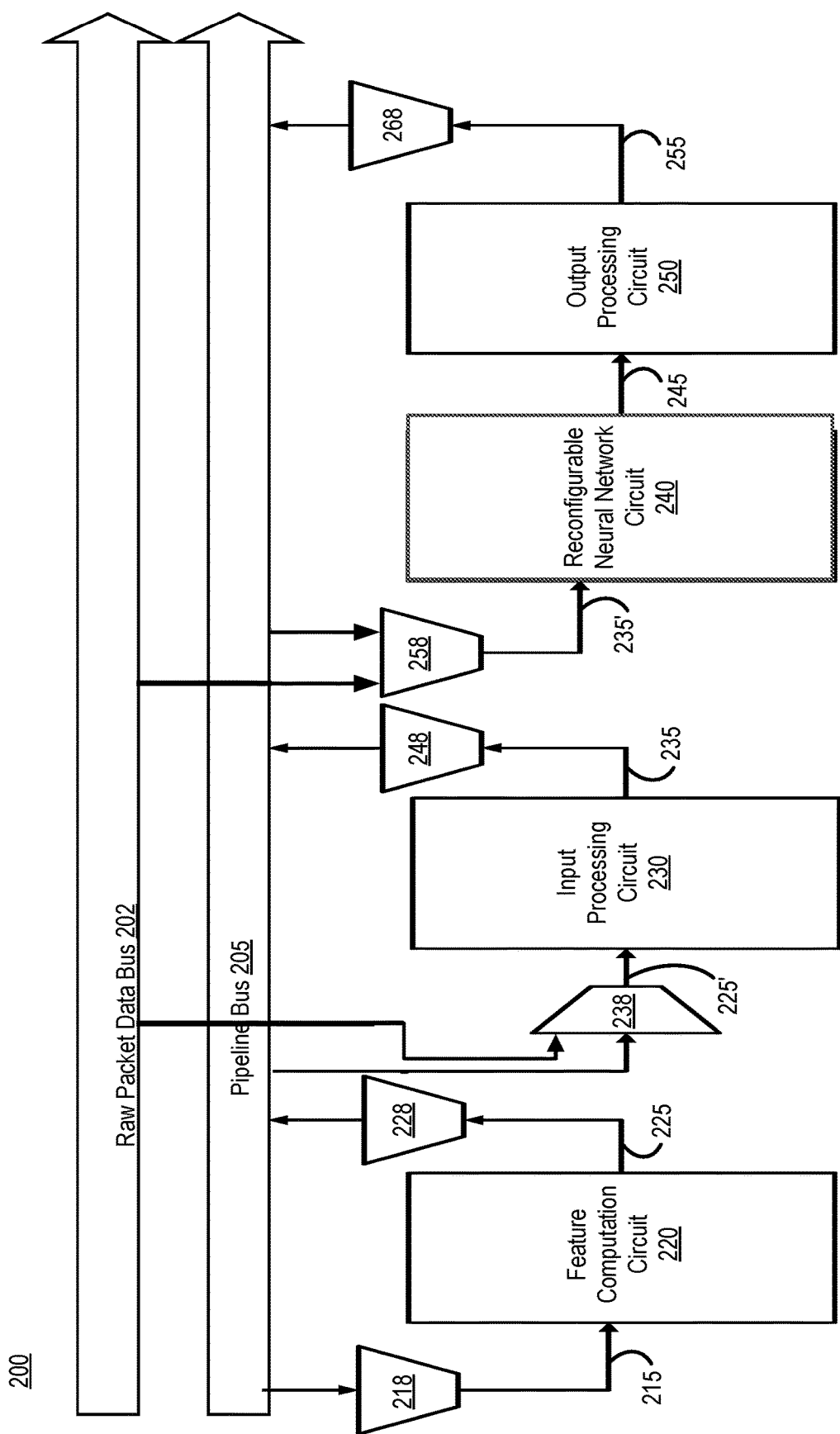
FIG. 2 illustrates a device for performing an inline network analysis based on a reconfigurable neural network, in accordance with an embodiment.

FIG. 2 illustrates a device 200 (or system) for performing an inline network analysis based on a reconfigurable neural network circuit 240, in accordance with an embodiment. The device 200 may be the access point 106, the network hardware 192, a network switch, or any network device. In some embodiments, the device 200 includes a feature computation circuit 220, an input processing circuit, 230, a reconfigurable neural network circuit 240, and an output processing circuit 250. The device 200 may also include a raw packet data bus 202 and a pipeline bus 205, multiplexers 218, 238, 258, and demultiplexers 228, 248, 268. The pipeline bus 205 may also provide packet metadata, flow metadata, packet attributes and flow attributes. The multiplexers 218, 238, 258 may selectively provide data between the raw packet data bus 202 and the pipeline bus 205 to the feature computation circuit 220, the input processing circuit, 230, and the reconfigurable neural network circuit 240. The demultiplexers 228, 248, 268 may selectively provide data output from the feature computation circuit 220, the input processing circuit, 230, and the output processing circuit 250 to the pipeline bus 205. These components may operate together to adaptively perform computations for one or more neural networks to generate or determine predicted network characteristics. In some embodiments, the device 200 includes more, fewer, or different components than shown in FIG. 2. For example, some of the multiplexers 218, 238, 258 and/or the demultiplexers 228, 248, 268 may be omitted or disposed at different locations than shown in FIG. 2.

In some embodiments, the feature computation circuit 220 is a circuit or a component that receives input attribute data 215 including a packet attribute or a flow attribute, and generates a feature data 225 including one or more statistical features of one or more packets or a flow based on the packet attribute or the flow attribute. Examples of statistical features include a flow start time, a last packet time, a total packet count, a total packet length, a minimum packet length, a maximum packet length, an average packet length, an average packet length difference, a median packet length, a minimum inter-packet arrival time (IAT), a maximum IAT, an average IAT, an average difference of IAT, a median IAT, a flow duration, a packet rate, a number of flags, etc. An average may be an exponentially moving average for a time period. A median may be an approximate median. The feature computation circuit 220 may receive the input attribute data 215 from other components (e.g., a processor, a counter, or a stateful table of the device 200) through the pipeline bus 205. According to the packet attribute or the flow attribute in the input attribute data 215, the feature computation circuit 220 may obtain or collect statistical features. The feature computation circuit 220 may perform computations on the stored statistical features to obtain derived statistical features, according to the packet attribute or the flow attribute. The feature computation circuit 220 may generate the feature data 225 including the one or more statistical features, and provide the one or more statistical features to the input processing circuit 230 through the pipeline bus 205. Detailed descriptions on implementations and operations of the feature computation circuit 220 are provided below with respect to FIGS. 4 and 5.

In some embodiments, the input processing circuit 230 is a circuit or a component that receives feature data 225' corresponding to the feature data 225 through the pipeline bus 205 and the multiplexer 238, and adjusts the feature data 225' to generate or obtain an adjusted feature data 235. In some embodiments, the reconfigurable neural network circuit 240 may implement a quantized neural network. In one aspect, the input processing circuit 230 may adjust the feature data 225' adaptively, such that the adjusted feature data 235 can be adequately processed by the reconfigurable neural network circuit 240 implementing a quantized neural network. For example, the input processing circuit 230 may adaptively perform scaling and imputation on the feature data 225', according to a packet attribute or a flow attribute. Detailed descriptions on implementations and operations of the input processing circuit 230 are provided below with respect to FIGS. 6 and 7.

In some embodiments, the reconfigurable neural network circuit 240 is a circuit or a component that receives adjusted feature data 235' corresponding to the adjusted feature data 235 through the pipeline bus 205, and performs computations of a neural network on the adjusted feature data 235' to obtain an indication 245 of a predicted network characteristic. In some embodiments, the reconfigurable neural network circuit 240 may receive a raw packet stream from a raw packet data bus 202, and perform computations on the raw packet stream instead. In one aspect, the reconfigurable neural network circuit 240 includes a set of computational circuits configured to perform computations according to neural network parameters (e.g., weights, biases, quantization parameters, a stride size, a pooling size, a type of activation function, etc.) of a neural network to generate or determine the indication 245 of the predicted network characteristic. The indication 245 may be an output of computation results of a neural network. The set of computational circuits can implement different neural networks or perform computations for different neural networks, according to a packet attribute or a flow attribute of a raw packet stream. For example, input signal selections of the set of computational circuits can be changed, according to the packet attribute or the flow attribute of the raw packet stream. For example, different neural network parameters can be applied to the set of computational circuits, according to the packet attribute or the flow attribute of the raw packet stream. The reconfigurable neural network circuit 240 can implement different neural networks for different packets in a pipeline configuration. Detailed descriptions on implementations and operations of the reconfigurable neural network circuit 240 are provided below with respect to FIGS. 8 and 9.

In some embodiments, the output processing circuit 250 is a circuit or a component that receives the indication 245 of the predicted network characteristic from the reconfigurable neural network circuit 240 implementing a quantized neural network, and performs post-processing on the indication 245 of the predicted network characteristic to generate output data 255 including the predicted network characteristic. In one approach, the output processing circuit 250 may adaptively generate the output data 255 through a regression analysis or classification analysis, according to a packet attribute or flow attribute. Detailed descriptions on implementations and operations of the output processing circuit 250 are provided below with respect to FIGS. 10 and 11.

Figure 3:
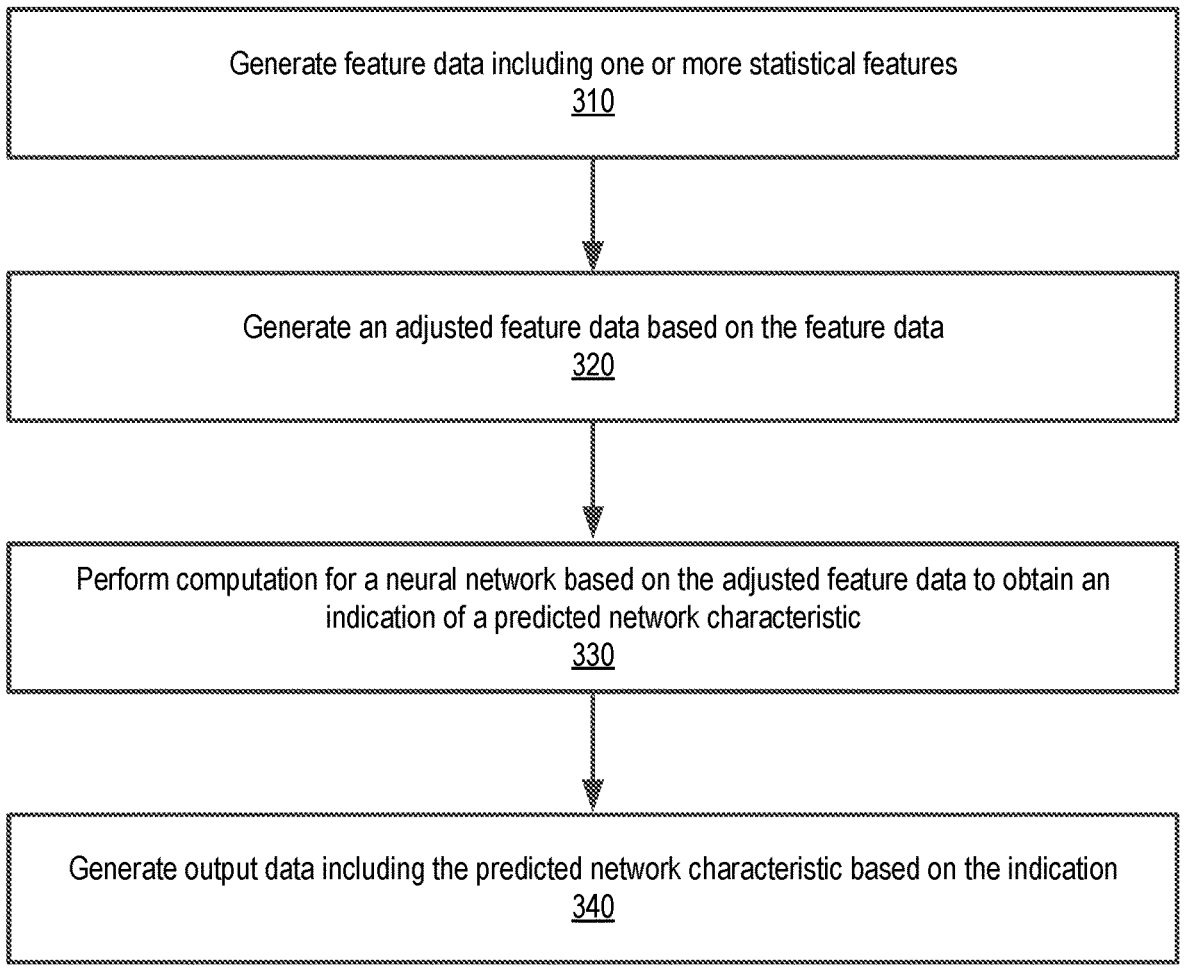
FIG. 3 illustrates a flow chart showing a process of determining a predicted network characteristic based on a reconfigurable neural network, in accordance with an embodiment.

FIG. 3 illustrates a flow chart showing a process 300 of determining a predicted network characteristic based on a reconfigurable neural network circuit 240, in accordance with an embodiment. In some embodiments, the process 300 is performed by the device 200. In some embodiments, the process 300 is performed by other entities. In some embodiments, the process 300 includes more, fewer, or different steps than shown in FIG. 3.

In one approach, the feature computation circuit 220 generates 310 feature data 225 including one or more statistical features of one or more packets. The feature computation circuit 220 may obtain or collect temporal statistics, according to the packet attribute or the flow attribute, and perform computations on the stored temporal statistics to generate the feature data 225 including the one or more statistical features or derived statistical features.

In one approach, the input processing circuit 230 generates 320 an adjusted feature data 235 based on the feature data 225 (or the feature data 225'). For example, the input processing circuit 230 may apply scaling and imputation on the feature data 225 (or the feature data 225') to obtain the adjusted feature data 235. In one aspect, different neural networks may be set or trained to perform computations for input data values with different ranges or precision. The input processing circuit 230 may adjust the feature data 225 (or the feature data 225'), such that the adjusted feature data 235 can have an appropriate range of values for computation for the neural network (e.g., quantized neural network).

In one approach, the reconfigurable neural network circuit 240 performs 330 computation for a neural network based on the adjusted feature data 235 (or the adjusted feature data 235') to obtain an indication 245 of a predicted network characteristic. In one aspect, the reconfigurable neural network circuit 240 includes a set of computational circuits that performs computations on the adjusted feature data 235 (or the adjusted feature data 235') according to neural network parameters of a neural network to determine the indication 245 of the predicted network characteristic. In one example, different inputs or signals of the set of computational circuits can be set or selected for different packet attributes or the flow attributes. In one example, different neural network parameters can be applied to the set of computational circuits for different packet attributes or flow attributes.

In one approach, the output processing circuit 250 generates 340 output data 255 including the predicted network characteristic based on the indication 245. In one approach, the output processing circuit 250 may determine whether the indication 245 is for a regression or a classification, and compute or determine a value or a decision vector as the output data 255 based on the determination on whether the indication 245 is for the regression or the classification.

In one aspect, the feature computation circuit 220, the input processing circuit 230, the reconfigurable neural network circuit 240, and the output processing circuit 250 can operate in a linear pipeline. By adaptively configuring each of the feature computation circuit 220, the input processing circuit 230, the reconfigurable neural network circuit 240, and the output processing circuit 250 differently for different packets according to packet attributes or flow attributes, the feature computation circuit 220, the input processing circuit 230, the reconfigurable neural network circuit 240, and the output processing circuit 250 can operate in a linear pipeline. For example, the feature computation circuit 220 can generate the feature data 225 for a first packet of a raw packet stream during a first clock cycle. Then, while the input processing circuit 230 generates the adjusted feature data 235 for the first packet of the raw packet stream during a second clock cycle, the feature computation circuit 220 can generate the feature data 225 for a second packet of the raw packet stream. In one aspect, each of the feature computation circuit 220, the input processing circuit 230, the reconfigurable neural network circuit 240, and the output processing circuit 250 can operate in a linear pipeline. Accordingly, the device 200 can perform computations at rates of the order of billions of packets per second (Bpps), such that complex network analysis may be performed in real time or at line rate.

Figure 4:
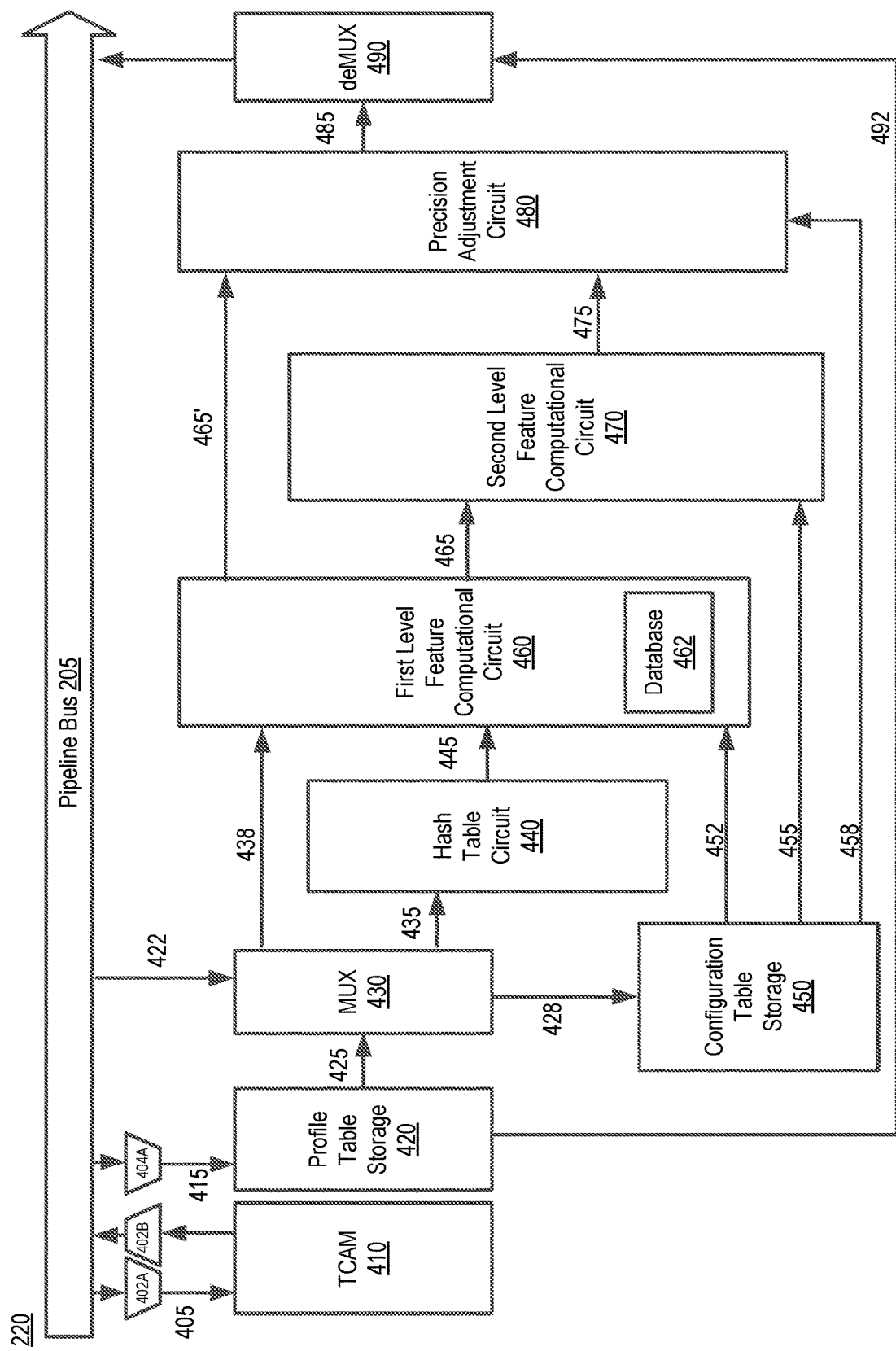
FIG. 4 illustrates a schematic diagram of a feature computation circuit, in accordance with an embodiment.

FIG. 4 illustrates a schematic diagram of the feature computation circuit 220, in accordance with an embodiment. In some embodiments, the feature computation circuit 220 includes a ternary content-addressable memory (TCAM) matching circuit 410, a profile table storage 420, multiplexers (MUXs) 402A, 404A, 430, demultiplexers (deMUXs) 402B, 490, a hash table circuit 440, a configuration table storage 450, a first level feature computational circuit 460, a second level feature computational circuit 470, a precision adjustment circuit 480. These components may be implemented as a field programmable gate array (FPGA), application specific integrated circuit (ASIC), or any logic circuit. These component may operate together to receive input attribute data 405, and generate a feature data 485 according to the input attribute data 405. In one aspect, the input attribute data 405 corresponds to input attribute data 215, and the feature data 485 corresponds to the feature data 225. In some embodiments, the feature computation circuit 220 includes more, fewer, or different components than shown in FIG. 4.

In one aspect, the TCAM matching circuit 410 and the profile table storage 420 may constitute or operate as a controller or a decoder. In one aspect, the TCAM matching circuit 410 receives the input attribute data 405 including a packet attribute or a flow attribute of a raw packet stream through the multiplexer 402A. The TCAM matching circuit 410 may store a plurality of values associated with corresponding indexes. The TCAM matching circuit 410 may utilize the packet attribute, the flow attribute or a combination of them as a key, and perform an AND operation between the key and a mask. Then, the TCAM matching circuit 410 may determine or search for a result of an AND operation between one of the stored values and the mask matching the result of the AND operation between the key and the mask. The TCAM matching circuit 410 may provide a profile index 415 associated with the value to the profile table storage 420 through the demultiplexer 402B, the pipeline bus 205, and the multiplexer 404A. The profile table storage 420 may store a table including a list of configuration indexes for corresponding profile indexes. The profile table storage 420 may provide a configuration index 428 corresponding to the received profile index 415 to the configuration table storage 450 through the pipeline bus 205 and the MUX 430. The profile table storage 420 may also store a table including a list of MUX control configuration settings for corresponding profile indexes. The profile table storage 420 may provide a MUX control configuration setting 425 corresponding to the received profile index 415 to the MUX 430. According to the MUX control configuration setting 425, the MUX 430 may provide one or more fields in the pipeline bus 205 corresponding to the hash key 435 to the hash table circuit 440, and provide one or more fields in the pipeline bus 205 corresponding to the configuration index 428 to the configuration table storage 450. The profile table storage 420 may also provide a deMUX control configuration setting 492 corresponding to the received profile index 415 to the demultiplexer 490. According to the deMUX control configuration setting 492, the demultiplexer 490 may provide the feature data 485 to the pipeline bus 205.

In one aspect, the configuration table storage 450 may store a table including a list of configuration settings for corresponding configuration indexes. The configuration table storage 450 may be embodied as a static random access memory (SRAM) or any storage device. In some embodiments, the configuration table storage 450 may be implemented as a controller or a decoder. The configuration table storage 450 may provide configuration settings 452, 455, 458 corresponding to the received configuration index 428 to the first level feature computational circuit 460, the second level feature computational circuit 470, and the precision adjustment circuit 480, respectively. The configuration settings 452, 455, 458 may indicate configurations of the first level feature computational circuit 460, the second level feature computational circuit 470, and the precision adjustment circuit 480, respectively.

In one aspect, the TCAM matching circuit 410, the profile table storage 420, and the configuration table storage 450 can identify a configuration setting for a particular packet attribute or a particular flow attribute. Rather than implementing a single component or a table to determine a configuration setting, implementing multiple components or tables can help improve storage and computational efficiency. For example, the feature computation circuit 220 may support a large number of permutations (e.g., 10,000-300,000) of different configuration settings. Implementing a single table to store a list of such large number of configuration settings may consume a large storage resource. By implementing the TCAM matching circuit 410, the profile table storage 420, and the configuration table storage 450 as disclosed herein, each of the TCAM matching circuit 410, the profile table storage 420, and the configuration table storage 450 can be implemented with less storage resources (e.g., 100 kb). Hence, the feature computation circuit 220 can be implemented in a small form factor. In some embodiments, the feature computation circuit 220 may include an array or multiples of TCAM matching circuits, profile table storages, and configuration table storages to support a larger number of permutations.

In one aspect, the MUX 430 receives a set of fields 422 of a flow or packet attributes from the pipeline bus 205, and selectively provides one or more fields corresponding to packet attributes or flow attributes 438 to the first level feature computational circuit 460 and one or more fields corresponding to the hash key 435 to the hash table circuit 440, according to the MUX control configuration setting 425. In some embodiments, the MUX 430 is embodied as an array of multiplexers. Examples of the packet attributes include a packet length, a timestamp, etc. The hash key 435 may be formed by a source address, destination address, a protocol, a source port, a destination port, any subset of packet or flow attributes, or any combination of them.

In one aspect, the hash table circuit 440 receives one or more fields corresponding to the hash key 435 from the MUX 430, and identifies an input flow according to the hash key 435. The hash table circuit 440 may include or may be embodied as memory, flops or a digital logic circuit. The hash table circuit 440 may determine whether the database 462 has a corresponding entry for a flow by searching the hash table. The hash table circuit 440 may store a set of database indexes for corresponding hash keys. A database index may include an index of a database 462. In one example, the hash table circuit 440 may determine whether the hash table circuit 440 stores an entry matching the hash key 435 received. If the hash table circuit 440 stores an entry matching the hash key 435, the hash table circuit 440 may determine that the database 462 has a corresponding entry for the flow. If the hash table circuit 440 does not store an entry matching the hash key 435, the hash table circuit 440 may determine that the database 462 does not have a corresponding entry for the flow. If the hash table circuit 440 determines that the database 462 does not have a corresponding entry for the flow, the hash table circuit 440 may store the hash key 435 and provide a database index 445 of the database 462 corresponding to the hash key 435 to the database 462 and/or the first level feature computational circuit 460. If the hash table circuit 440 determines that the database 462 has a corresponding entry for the flow, the hash table circuit 440 may provide the database index 445 to the database 462 and/or the first level feature computational circuit 460.

In one aspect, the first level feature computational circuit 460 may perform computation on one or more fields corresponding to packet attribute or flow attribute 438 according to the configuration setting 452 to obtain temporal statistics of the flow, and store the temporal statistics or update the database 462 with the temporal statistics. Examples of temporal statistics include a packet count in a flow, a total packet bytes, a minimum packet length, maximum packet length, average packet length, a minimum inter arrival time, maximum inter arrival time, average inter arrival time, flag counts, etc. For example, the first level feature computational circuit 460 may compare the stored temporal statistic with a packet attribute or flow attribute 438 selected by MUX 430, or compare the packet or flow attribute with a constant, to return a Boolean result, according to the configuration setting 452. For example, the first level feature computational circuit 460 may update, according to the configuration setting 452, the temporal statistics by applying one of following operations: adjusting a stored temporal statistic by subtracting an attribute value or adding the attribute value, obtaining a minimum or a maximum between the stored temporal statistic and an attribute value, obtaining an approximate median or exponential moving average. The first level feature computation circuit 460 may provide temporal statistics as statistical features or perform computations on the temporal statistics to obtain derived temporal statistics as statistical features. The first level feature computation circuit 460 may provide the first result 465' including the statistical features (temporal statistics and/or derived temporal statistics) to the precision adjustment circuit 480 or the first result 465 to the second level feature computational circuit 470, according to the configuration setting 452.

In one aspect, packet attributes or flow attributes utilized by the TCAM matching circuit 410 for determining the profile index 415, packet attributes or flow attributes utilized by the hash table circuit 440 for obtaining the hash key 435, and packet attributes or flow attributes utilized by the first level feature computational circuit 460 to obtain temporal statistic may be different.

In one aspect, an aging control can be provided, according to the configuration setting 452. For example, an entry in the database 462 for a raw packet stream that has not been accessed or updated for a predetermined number of clock cycles may be removed from the database 462. The hash table circuit 440 may remove an entry of a hash table including a corresponding database index of the removed entry in the database 462. Accordingly, the database 462 may not be overloaded due to infrequent packet streams. For example, an entry can be aged out if there has been no hit for a pre-configured number of clock cycles or number of packets in the packet stream as indicated by the configuration setting 452. This allows the database 462 and the hash table circuit 440 to efficiently free up entries for flows where an end-of-flow condition cannot be easily detected or the packet indicating an end-of-flow condition was dropped.

In one aspect, a saturation control can be provided, according to the configuration setting 452. For example, if a value of an entry in the database 462 is beyond an allowable range of values, the database 462 may indicate the value is invalid, return a predetermined value (e.g., threshold value), or maintain the value, according to the configuration setting 452. For example if the database 462 has a 16 bit to store the packet count of a flow, the packet count can go from 0 to 65535. At 65535, the accumulator may saturate. Also, certain features may be dependent on flow duration, such as packet rate, byte rate etc. When the flow duration is too long, the timer keeping track of the flow duration may saturate. When a certain accumulator or counter saturates, the affected feature can be calculated based on the saturated value (e.g., 65535 for the 65536th packet and beyond), an invalid signal can be provided to downstream pipeline components to ignore outputs of the reconfigurable neural network circuit 240, or cause the input processing circuit 230 to impute a value.

In one aspect, the second level feature computational circuit 470 performs computations on the first result 465 to obtain a second result 475, according to the configuration setting 455. For example, the second level feature computational circuit 470 may perform a minimum selection between two features, a maximum selection between two features, an average calculation, add or subtract two features, etc. The second level feature computational circuit 470 may provide the second result 475 to the precision adjustment circuit 480.

In one aspect, the precision adjustment circuit 480 receives the first result 465' and/or the second result 475, and generates feature data 485 according to the configuration setting 458. In one example, the precision adjustment circuit 480 may determine whether the feature data 485 should be provided starting from the first packet in a flow, or after certain number of packets, according to the configuration setting 458. In one example, the precision adjustment circuit 480 may apply a shift operation on the first result 465' or the second result 475 for quantization, according to the configuration setting 458. For example, a 24 bit of features in the first result 465' or the second result 475 can be right shifted by 8 bits to obtain the feature data 485 including two 8 bit features for applying to a quantized neural network.

In one aspect, the demultiplexer 490 is an N-bit demultiplexer. In some embodiments, the demultiplexer 490 corresponds to or is implemented as the demultiplexer 228. In some embodiments, the demultiplexer 490 is embodied as an array of demultiplexers. The demultiplexer 490 may receive the feature data 485 from the precision adjustment circuit 480, and selectively provide the feature data 485 to the input processing circuit 230 through the pipeline bus 205, according to the deMUX control configuration setting 492. For example, the demultiplexer 490 may provide the feature data 485 at corresponding fields, according to the deMUX control configuration setting 492.

In one aspect, the feature computation circuit 220 can be adaptively configured or arranged to obtain different statistical features for different raw packet streams. The feature computation circuit 220 can be configured differently for each packet. By adaptively configuring the first level feature computational circuit 460, the second level feature computational circuit 470, and the precision adjustment circuit 480, the first level feature computational circuit 460, the second level feature computational circuit 470, and the precision adjustment circuit 480 can operate in a linear pipeline. For example, the first level feature computational circuit 460 can generate the first result 465 for a first packet of a raw packet stream during a first clock cycle. Then, while the second level feature computational circuit 470 generates the second result 475 for the first packet of the raw packet stream during a second clock cycle based on the first result 465 obtained during the first clock cycle, the first level feature computational circuit 460 can generate a first result 465 for a second packet of the raw packet stream. In some embodiments, each of TCAM matching circuit 410, the profile table storage 420, the first level feature computational circuit 460, the second level feature computational circuit 470, and the precision adjustment circuit 480 can be internally pipelined and execute over multiple clock cycles. Accordingly, the feature computation circuit 220 can perform computations at high speed to obtain different statistical features for different packets in real time or at line rate.

Figure 5:
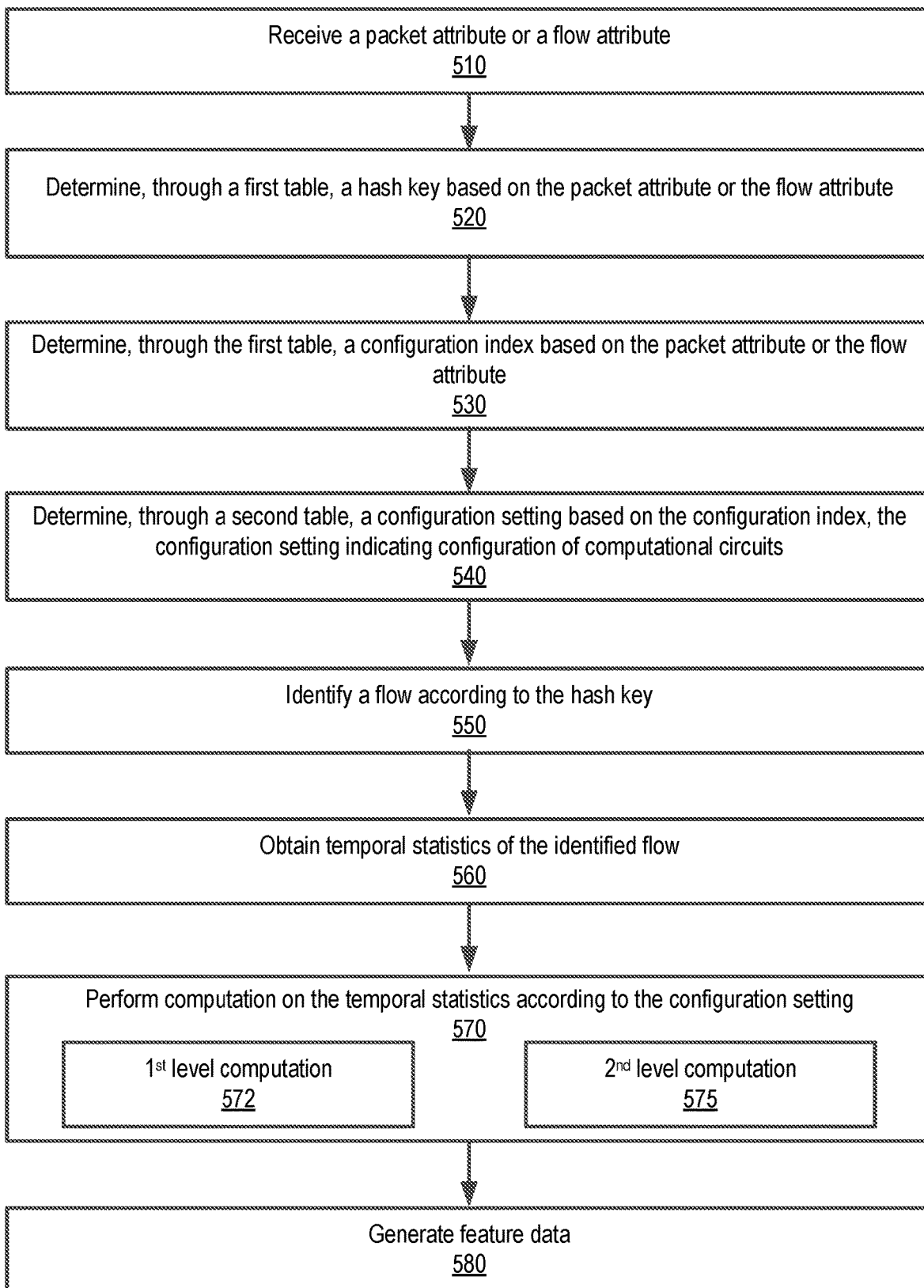
FIG. 5 illustrates a flow chart showing a process of adaptively generating feature data, in accordance with an embodiment.

FIG. 5 illustrates a flow chart showing a process 310 of adaptively generating feature data, in accordance with an embodiment. In one approach, the process 310 is performed by the feature computation circuit 220. In some embodiments, the process 310 is performed by other entities. In some embodiments, the process 310 includes more, fewer, or different steps than shown in FIG. 5.

In one approach, the feature computation circuit 220 receives 510 input attribute data 405 including a packet attribute or a flow attribute of a raw packet stream.

In one approach, the feature computation circuit 220 determines 520, through a first table (e.g., profile table), a hash key based on the packet attribute or the flow attribute. For example, the TCAM matching circuit 410 may determine a profile index 415 with a matching packet attribute or a flow attribute, and provide the profile index 415 to the profile table storage 420. In response to the profile index 415, the profile table stored by the storage 420 may determine, identify, or provide a corresponding MUX control configuration setting. According to the MUX control configuration setting, the MUX 430 may select and provide one or more fields of one or more attributes of a flow in the pipeline bus 205 corresponding to the hash key 435.

In one approach, the feature computation circuit 220 determines 530, through the first table (e.g., profile table stored by the storage 420), a configuration index 428 based on the packet attribute or the flow attribute. For example, in response to the profile index 415, the profile table stored by the storage 420 may determine, identify, or provide a corresponding configuration index 428.

In one approach, the feature computation circuit 220 determines 540, through a second table (e.g., configuration table stored by the storage 450), a configuration setting (e.g., configuration settings 452, 455, 458) based on the configuration index 428. The configuration setting may indicate configuration of computational circuits (e.g., the first level feature computational circuit 460, the second level feature computational circuit 470, and the precision adjustment circuit 480).

In one approach, the feature computation circuit 220 identifies 550 a flow, according to the hash key 435. The hash table circuit 440 may determine whether the database 462 has a corresponding entry for the flow according to the hash key 435. For example, the hash table circuit 440 may determine whether the hash table circuit 440 stores an entry matching the hash key 435 received. If the hash table circuit 440 stores an entry matching the hash key 435, the hash table circuit 440 may determine that the database 462 has a corresponding entry for the flow. If the hash table circuit 440 does not have an entry matching the hash key 435, the hash table circuit 440 may determine that the database 462 does not have an entry corresponding to the flow. The hash table circuit 440 may send to the first level feature computational circuit 460, an indication indicating whether the database has a corresponding entry for the flow. The hash table circuit 440 may send, to the first level feature computational circuit 460 and the database 462, the database index 445 of the database 462 corresponding to the hash key 435, in response to determining that the database 462 does not have the corresponding entry for the flow. The hash table circuit 440 may send, to the first level feature computational circuit 460 and the database 462, the database index 445 corresponding to the hash key 435, in response to determining that the database 462 has the corresponding entry for the flow. An entry of the database 462 associated with the database index 445 can be updated.

In one approach, the feature computation circuit 220 obtains 560 temporal statistics of the identified flow. For example, the first level feature computational circuit 460 may perform computation on one or more fields corresponding to packet attribute or flow attribute 438 according to the configuration setting 452 to obtain temporal statistics of the flow. If the hash table circuit 440 determines that the database 462 does not have a corresponding entry for the flow as indicated by the indicator, the first level feature computational circuit 460 may cause the database 462 may create a new entry with the database index and store temporal statistics of the flow in the new entry. If the hash table circuit 440 determines that the database 462 has a corresponding entry for the flow as indicated by the indicator, the first level feature computational circuit 460 may cause the database 462 to update the corresponding entry at the database index 445 with the temporal statistics of the flow.

In one approach, the feature computation circuit 220 performs 570 computation on the temporal statistics, according to the configuration setting. For example, the first level feature computational circuit 460 may perform a first level computation 572 on the temporal statistics (or statistical features) to obtain the first result 465, according to the configuration setting 452. For example, the second level feature computational circuit 470 may perform a second level computation 575 on the first result 465 to obtain the second result 475, according to the configuration setting 455.

In one approach, the feature computation circuit 220 generates 580 the feature data 485, according to the configuration setting. For example, the precision adjustment circuit 480 may generate the feature data 485 having a certain number of bits, or based on the first result 465 or the second result 475, according to the configuration setting 458 for computation by a quantized neural network.

Figure 6:
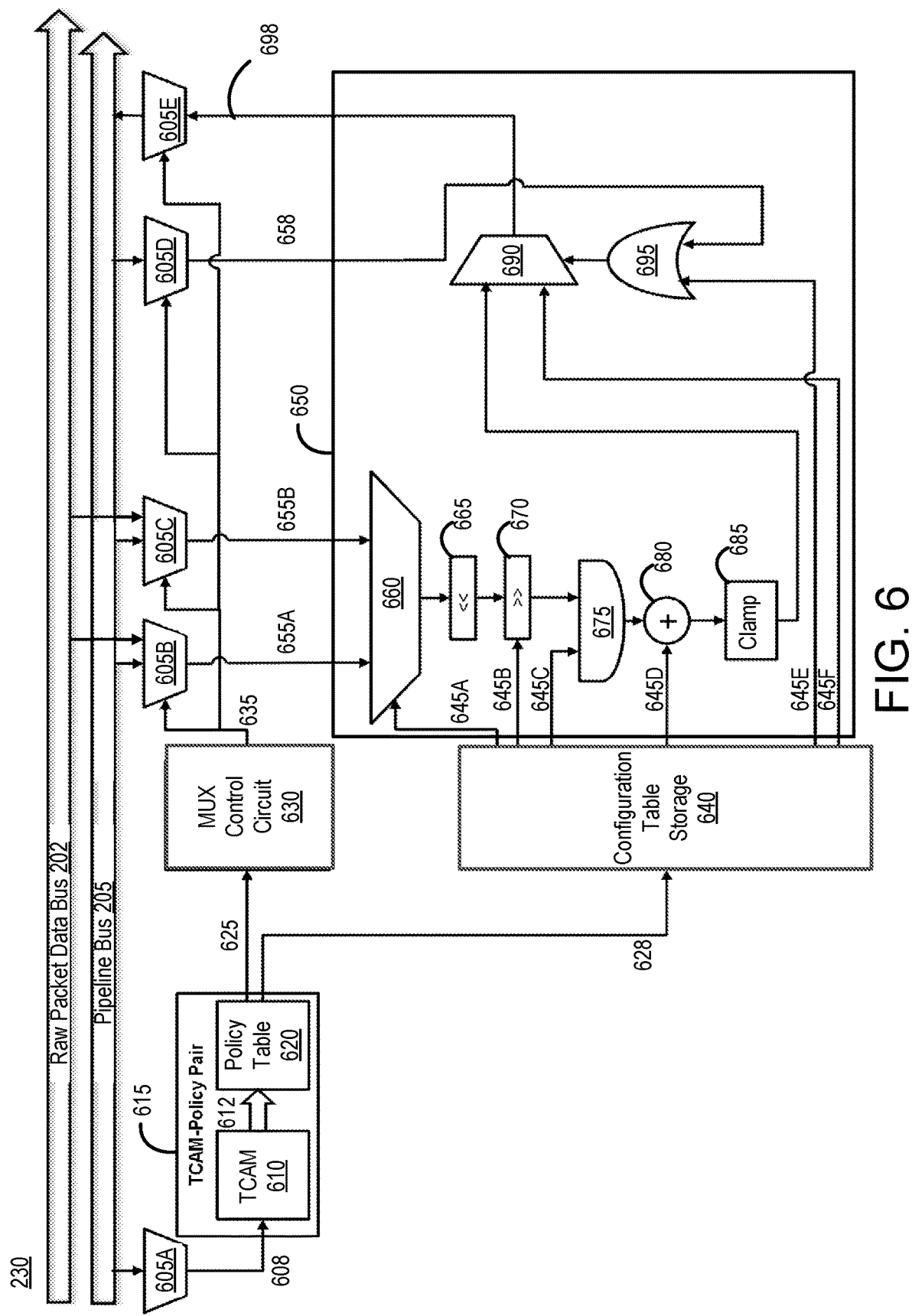
FIG. 6 illustrates a schematic diagram of an input processing circuit, in accordance with an embodiment.

FIG. 6 illustrates a schematic diagram of the input processing circuit 230, in accordance with an embodiment. In some embodiments, the input processing circuit 230 includes MUXs 605A . . . 605D, a demultiplexer 605E, a TCAM matching circuit 610, a policy table storage 620, a MUX control circuit 630, a configuration table storage 640, and a scaling and imputation circuit 650. These components may be implemented as a field programmable gate array (FPGA), application specific integrated circuit (ASIC), or any logic circuit. These component may operate together to receive input attribute data 608, and generate an adjusted feature data 698. In one aspect, the adjusted feature data 698 corresponds to the adjusted feature data 235. In one aspect, the input processing circuit 230 generates the adjusted feature data 698 for application to a quantized neural network. In some embodiments, the input processing circuit 230 includes more, fewer, or different components than shown in FIG. 6. In some embodiments, the TCAM matching circuit 610, the policy table storage 620, the MUX control circuit 630, and the configuration table storage 640 are embodied as a single component or a single controller.

In one aspect, the TCAM matching circuit 610 and the policy table storage 620 may constitute or operate as a controller 615 or a decoder. In one aspect, the TCAM matching circuit 610 receives input attribute data 608 including a packet attribute or a flow attribute of a raw packet stream through the multiplexer 605A. The TCAM matching circuit 610 may utilize the packet attribute, the flow attribute, or a combination of them as a key, and perform an AND operation between the key and a mask. Then, the TCAM matching circuit 610 may determine or search for a result of an AND operation between one of the stored values and the mask matching the result of the AND operation between the key and the mask. The TCAM matching circuit 610 may provide a policy index 612 associated with the value to the policy table storage 620. The policy table storage 620 may store a table including a list of configuration indexes for corresponding policy indexes. In some embodiments, the policy table storage 620 is embodied as SRAM or any storage device. The policy table storage 620 may provide a configuration index 628 corresponding to the received policy index 612 to the configuration table storage 640. The policy table storage 620 may provide a control index 625 associated with the configuration index 628 to the MUX control circuit 630.

In one aspect, the configuration table storage 640 may store a table including a list of configuration settings for corresponding configuration indexes. The configuration table storage 640 may be embodied as a static random access memory (SRAM) or any storage device. In some embodiments, the configuration table storage 640 may be implemented as a controller or a decoder. The configuration table storage 640 may provide configuration settings 645A-645F corresponding to the received configuration index 628 to various components of the scaling and imputation circuit 650. The configuration settings 645A-645F may indicate configurations of the components of the scaling and imputation circuit 650.

In one aspect, the TCAM matching circuit 610, the policy table storage 620, and the configuration table storage 640 can identify a configuration setting 645 for a particular packet attribute or a particular flow attribute. Rather than implementing a single component or a table to determine a configuration setting 645, implementing multiple components or tables can help improve storage and computational efficiency. For example, the input processing circuit 230 may support a large number of permutations (e.g., 10,000-300,000) of different configuration settings 645. Implementing a single table to store a list of such large number of configuration settings 645 may consume a large storage resource. By implementing the TCAM matching circuit 610, the policy table storage 620, the configuration table storage 640, and the MUX control circuit 630 as disclosed herein, each of the TCAM matching circuit 610, the policy table storage 620, the configuration table storage 640, and the MUX control circuit 630 can be implemented with less storage resources (e.g., 100 kb). Hence, the input processing circuit 230 can be implemented in a small form factor.

The MUX control circuit 630 may be a circuit to control MUXs 605B, 605C, 605D, and demultiplexer 605E, according to a control index 625. The MUX control circuit 630 may include a table of a list of different configurations or control signals of MUXs 605B, 605C, 605D and the demultiplexer 605E for corresponding control indexes. The MUX control circuit 630 may receive the control index 625, and may generate control signals 635 corresponding to the control index 625. The MUX control circuit 630 may apply the control signals 635 to MUXs 605B, 605C, 605D and the demultiplexer 605E.

In some embodiments, the MUX 605B is an N bit multiplexer (e.g., 16 bit), and the MUX 605C is a 1 bit multiplexer. In some embodiments, each of the MUX 605B and the MUX 605C may be embodied as an array of multiplexers. The MUX 605B may select an ordinal feature 655A of feature data (e.g., feature data 225') to be processed, where MUX 605C may select a categorical feature 655B of feature data (e.g., feature data 225') to be processed. An ordinal feature 655A may be a feature represented by a bit width up to double the quantization precision, where a categorical feature 655B may be a binary feature (e.g., flag) or a feature represented by one bit (e.g., one-hot encoded feature). For example, for an 8 bit quantization precision, the ordinal feature 655A may be represented up to 16 bits. The MUX 605B may selectively provide N bit ordinal feature 655A from the pipeline bus 205 or the raw packet data bus 202 to a MUX 660 of the scaling and imputation circuit 650, according to control signals 635. Similarly, the MUX 605C may selectively provide 1 bit categorical feature 655B from the pipeline bus 205 or the raw packet data bus 202 to the MUX 660, according to control signals 635.

In some embodiments, the MUX 605D is a one bit multiplexer. In some embodiments, the MUX 605D may be embodied as an array of multiplexers. The MUX 605D may receive a 1-bit valid feature indicator 658 from the pipeline bus 205, and selectively provide the 1-bit valid feature indicator to an OR gate 695 of the scaling and imputation circuit 650, according to control signal 635. The 1-bit valid feature indicator 658 may indicate whether the ordinal feature 655A or the categorical feature 655B has a valid value. According to the valid feature indicator 658, the scaling and imputation circuit 650 may perform imputation.

In some embodiments, the scaling and imputation circuit 650 receives the feature data (e.g., ordinal feature 655A or categorical feature 655B), and generates an adjusted feature data 698, according to configuration settings 645A-645F from the configuration table storage 640. In some embodiments, the scaling and imputation circuit 650 includes a N-bit multiplexer 660, a left shifter 665, a right shifter 670, a mask operator 675, an adder 680, a clamp circuit 685, a N-bit multiplexer 690, and an OR gate 695. The multiplexer 660 may be embodied as an array of multiplexers. In some embodiments, the shifter 665 may be embodied as a left shifter or an array of left shifters. In some embodiments, the shifter 670 may be embodied as a right shifter or an array of right shifters. In some embodiments, the mask operator 675 is embodied as an array of mask operators. In some embodiments, the adder 680 is embodied as an array of adders. The adder 680 may be a signed adder. In some embodiments, the clamp circuit 685 is embodied as an array of clamp circuits. These components may operate together to perform scaling and imputation on the received feature data to generate an adjusted feature data 698. In some embodiments, the scaling and imputation circuit 650 includes more, fewer, or different components than shown in FIG. 6.

The multiplexer 660 may provide ordinal feature 655A or categorical feature 655B to the shifter 665 according to a configuration setting 645A.

The shifters 665, 670, the mask operator 675, the adder 680, and the clamp circuit 685 may constitute a scaling circuit to perform a scale and mask operation. In one aspect, the left shifter 665 may perform left shifting operation and the right shifter 670 may perform right shifting operation according to configuration setting 645B for scaling. In one aspect, the mask operator 675 may perform masking operation on the shifted values from the shifter 670, according to configuration setting 645C from the configuration table storage 640. In one example, the mask operator 675 is implemented as N-bit AND gate to perform AND logic operation between the shifted outputs from the shifter 670 and a reference value in configuration setting 645C from the configuration table storage 640. The adder 680 may add an offset to the output of the mask operator 675, according to an offset value in a configuration setting 645D from the configuration table storage 640. The clamp circuit 685 may clamp the output of the adder 680. In one aspect, the clamp circuit 685 clamps values to a predefined range based on a quantization precision of the reconfigurable neural network circuit 240. For example for a 8b quantized neural network, the clamp circuit 685 may clamp the values to be between −128 and +127. For example, if an input value is less than −128, the clamp circuit 685 may set an output value to be −128. For example, if an input value is greater than 127, the clamp circuit 685 may set an output value to be 127. For example, if an input value is between −128 and 127, the clamp circuit 685 may set an output value as the input value. Accordingly, the shifters 665, 670, the mask operator 675, the adder 680, and the clamp circuit 685 may perform a scale and mask operation with simple components such as shifters 665, 670 without complex circuits (e.g., multipliers, dividers, etc.). Accordingly, the scaling and imputation circuit 650 can be implemented in a simple architecture and save computational resources.

In one aspect, the scaling and imputation circuit 650 can discard unwanted lower bits, and mask out lower bits if needed in order to bucketize value. Then, the scaling and imputation circuit 650 can cast to signed integer, and spread adjusted value as evenly across quantization range (e.g., between −128 and 127 for 8b). The scaling and imputation circuit 650 may be implemented with a simple architecture as shown in FIG. 6, because feature data, packet attributes or flow attributes may be in the form of simple unsigned integers.

In one aspect, the multiplexer 690 and the OR gate 695 may constitute an imputation circuit to perform imputation. In some embodiments, the multiplexer 690 is embodied as an array of multiplexers, and the OR gate 695 is embodied as an array of OR gates. In one aspect, the imputation circuit may detect an invalid value in the feature data and substitute the invalid value with a configured value. For example, the multiplexer 690 receives the output of the clamp circuit 685, and an assigned value or a configured value in configuration setting 645E to apply. According to the 1-bit valid feature indicator 658 or a configuration setting 645F (e.g., force imputation control), the multiplexer 690 can select or provide the output of the clamp circuit 685 or the assigned value (or configured value) as the adjusted feature data 698.

In some embodiments, the demultiplexer 605E is an N-bit demultiplexer. In some embodiments, the demultiplexer 605E corresponds to or is implemented as the demultiplexer 248. In some embodiments, the demultiplexer 605E may be embodied as an array of demultiplexers. The demultiplexer 605E may be coupled to an output of the multiplexer 690 of the scaling and imputation circuit 650. The demultiplexer 605E may receive the adjusted feature data 698 from the N-bit output of the MUX 690, and selectively provide the adjusted feature data 698 to the reconfigurable neural network circuit 240 through the pipeline bus 205, according to control signals 635. For example, the demultiplexer 605E may provide the adjusted feature data 698 at corresponding fields, according to the control signal 635.

Figure 7:
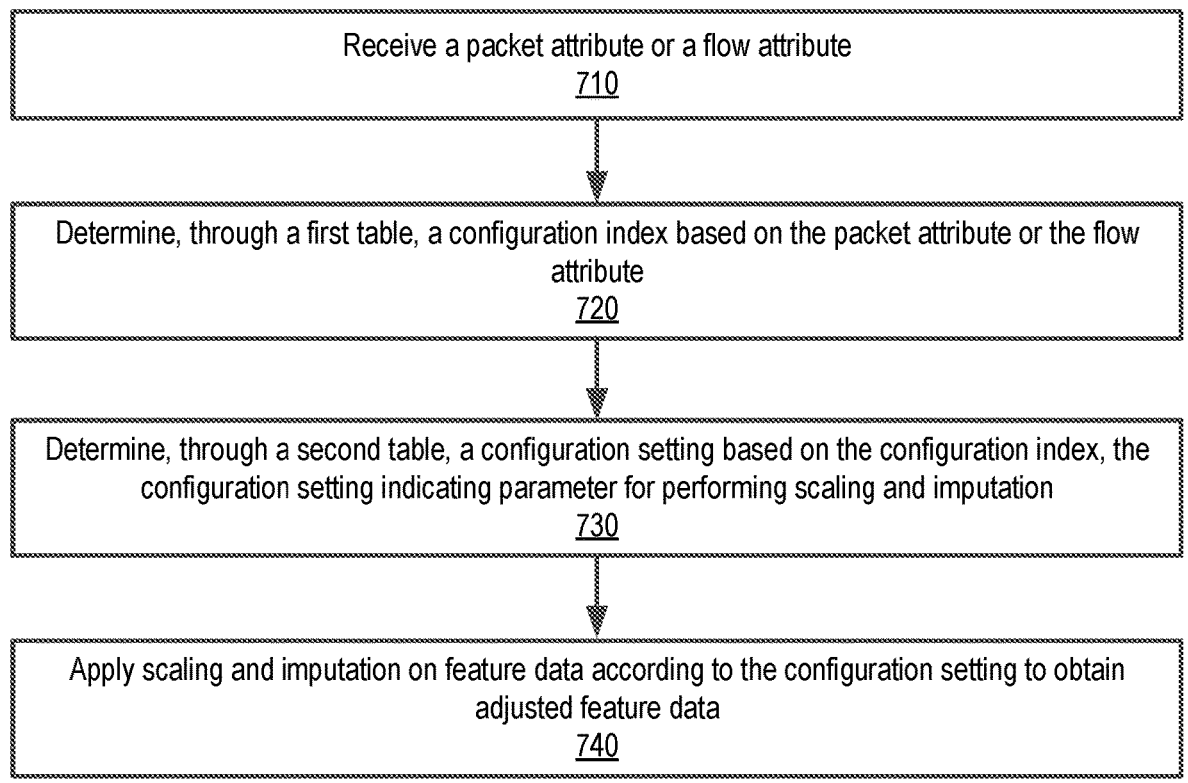
FIG. 7 illustrates a flow chart showing a process of adaptively adjusting a feature data to obtain an adjusted feature data, in accordance with an embodiment.

FIG. 7 illustrates a flow chart showing a process 320 of adaptively adjusting a feature data to obtain an adjusted feature data, in accordance with an embodiment. In one approach, the process 320 is performed by the input processing circuit 230. In some embodiments, the process 320 is performed by other entities. In some embodiments, the process 320 includes more, fewer, or different steps than shown in FIG. 7.

In one approach, the input processing circuit 230 receives 710 input attribute data 608 including a packet attribute or a flow attribute.

In one approach, the input processing circuit 230 determines 720, through a first table (e.g., policy table), a configuration index based on the packet attribute or the flow attribute. For example, the TCAM matching circuit 610 may determine a policy index 612 with a matching packet attribute or a flow attribute, and provide the policy index 612 to the policy table storage 620. In response to the policy index 612, the policy table stored by the storage 620 may determine, identify, or provide a corresponding configuration index 628.

In one approach, the input processing circuit 230 determines 730, through a second table (e.g., configuration table stored by the storage 640), a configuration setting based on the configuration index 628. The configuration setting may indicate configurations of various circuits or components of the scaling and imputation circuit 650 (e.g., the N-bit multiplexer 660, the left shifter 665, the right shifter 670, the mask operator 675, the adder 680, the clamp circuit 685, the N-bit multiplexer 690, the OR gate 695, etc.).

In one approach, the input processing circuit 230 applies 740, scaling and imputation on feature data (e.g., feature data 225' or 655), according to the configuration setting to obtain adjusted feature data (e.g., adjusted feature data 235 or 698). In one aspect, the scaling is performed by simple components such as shifters and the imputation is performed by a multiplexer without using complex logic circuits such as multipliers, dividers or other complex circuits for quantization. Accordingly, the input processing circuit 230 can be implemented in a small form factor, and perform scaling and imputation in a prompt manner with reduced power consumption.

Figure 8:
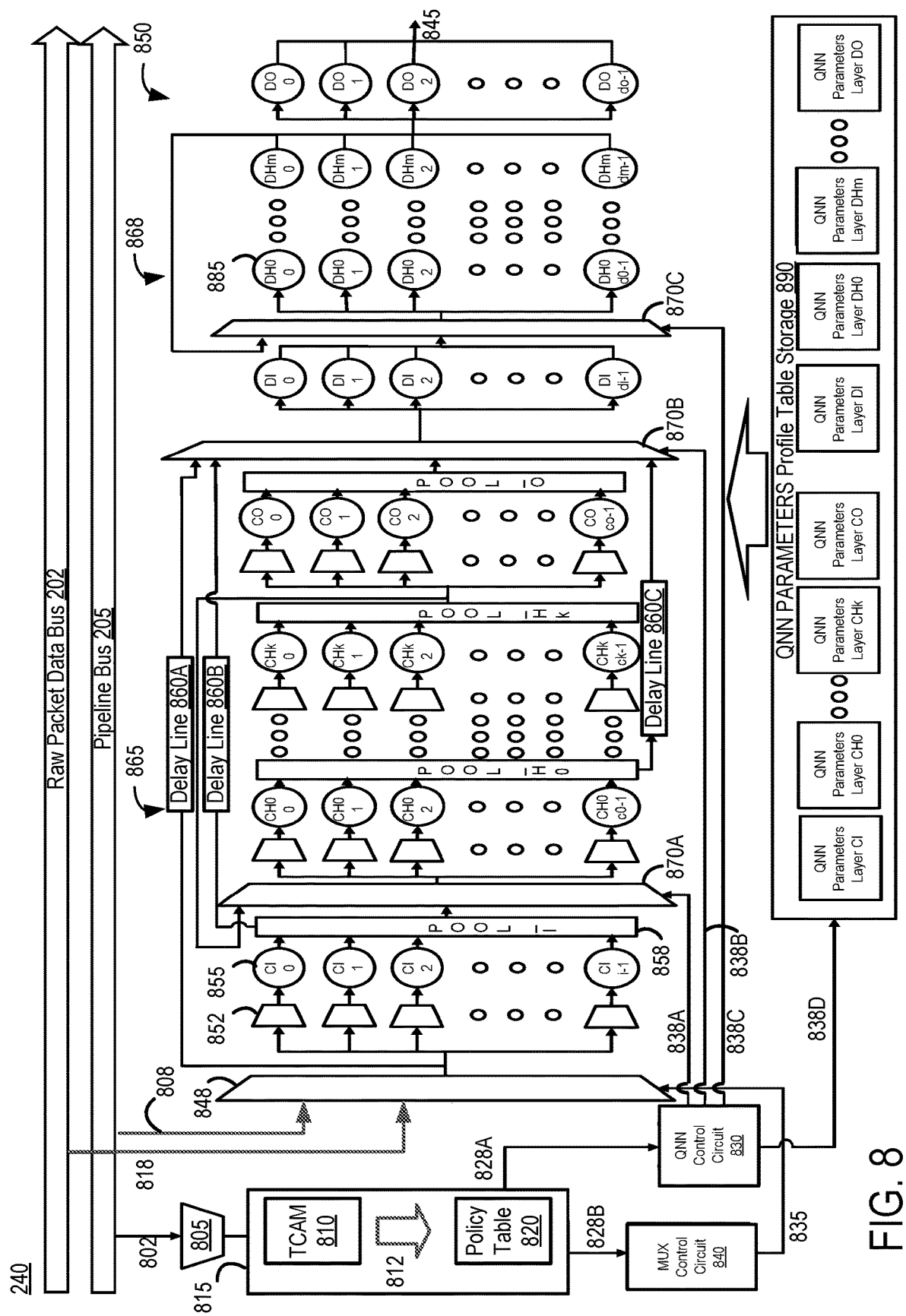
FIG. 8 illustrates a schematic diagram of a reconfigurable neural network circuit, in accordance with an embodiment.

FIG. 8 illustrates a schematic diagram of the reconfigurable neural network circuit 240, in accordance with an embodiment. In some embodiments, the reconfigurable neural network circuit 240 includes a multiplexer 805, a TCAM matching circuit 810, a policy table storage 820, a MUX control circuit 840, a quantized neural network (QNN) control circuit 830, a QNN parameters profile table storage 890, and a set of computational circuits 850. These components may be implemented as a field programmable gate array (FPGA), application specific integrated circuit (ASIC), or any logic circuit. These component may operate together to receive a feature data 808 from the pipeline bus 205 or one or more packets 818 from the raw packet data bus 202, and generate an output or an indication 845 of a predicted network characteristic. In one aspect, the feature data 808 corresponds to the adjusted feature data 235 (or adjusted feature data 235'), and the indication 845 of the predicted network characteristic corresponds to the indication 245 of the predicted network characteristic. In some embodiments, the reconfigurable neural network circuit 240 includes more, fewer, or different components than shown in FIG. 8. In some embodiments, the TCAM matching circuit 810, the policy table storage 820, the MUX control circuit 840, and the QNN control circuit 830 are embodied as a single component or a single controller.

In one aspect, the TCAM matching circuit 810 and the policy table storage 820 may constitute or operate as a controller 815 or a decoder. In one aspect, the TCAM matching circuit 810 receives input attribute data 802 including a packet attribute or a flow attribute of a raw packet stream through the multiplexer 805. The TCAM matching circuit 810 may utilize the packet attribute, the flow attribute, or a combination of them as a key, and perform an AND operation between the key and a mask. Then, the TCAM matching circuit 810 may determine or search for a result of an AND operation between one of the stored values and the mask matching the result of the AND operation between the key and the mask. The TCAM matching circuit 810 may provide a policy index 812 associated with the value to the policy table storage 820. The policy table storage 820 may store a table including a list of configuration indexes for corresponding policy indexes. In some embodiments, the policy table storage 820 is embodied as SRAM or any storage device. The policy table storage 820 may provide a configuration index 828A corresponding to the received policy index 812 to the QNN control circuit 830. The policy table storage 820 may provide a MUX control index 828B associated with the configuration index 828A to the MUX control circuit 840.

In some embodiments, the TCAM matching circuit 810 and the policy table storage 820 may determine different configuration settings for different packets. For example, the TCAM matching circuit 810 and the policy table storage 820 may determine a first configuration setting corresponding to a packet attribute or a flow attribute of a first packet of the raw packet stream during a first clock cycle. Then, the TCAM matching circuit 810 and the policy table storage 820 may determine a second configuration setting corresponding to a packet attribute or a flow attribute of a second packet of the raw packet stream during a second clock cycle next to or subsequent to the first clock cycle. Accordingly, the reconfigurable neural network circuit 240 can be set, configured or operated differently for different packets for different neural networks in a pipeline manner.

In one aspect, the QNN control circuit 830 may set, configure, or control the operations of the set of computational circuits 850 and the QNN parameters profile table storage 890, according to the configuration index 828A. The QNN control circuit 830 may include a storage that stores a table including a list of configuration settings for corresponding configuration indexes. The QNN control circuit 830 may provide first configuration settings including control signals 838A-838C corresponding to the received configuration index 828A to various components of the set of computational circuits 850. The first configuration settings including the control signals 838A-838C may indicate which components (e.g., MAC circuits, convolution layers) to enable or select. The QNN control circuit 830 may also provide second configuration settings including QNN profile indexes 838D corresponding to the received configuration index 828A to the QNN parameters profile table storage 890. The second configuration settings including QNN profile indexes 838D may indicate which neural network parameters of which neural network to apply to which layer or subset of the set of computational circuits 850. In some embodiments, the QNN control circuit 830 may also perform admission control, and generate a busy signal. In some embodiments, the QNN control circuit 830 may not admit a packet or a set of features on a clock cycle for inference, if there is a predicted resource conflict to use or reuse the same computation resource during the same clock cycle.

The MUX control circuit 840 may be a circuit to control MUX 848, according to a MUX control index 828B. The MUX control circuit 840 may include a table of a list of different configurations or control signals of MUX 848 for corresponding MUX control indexes. The MUX control circuit 840 may receive the MUX control index 828B, and may generate a MUX control signal 835 corresponding to the MUX control index 828B. The MUX control circuit 840 may apply the MUX control signal 835 to the MUX 848.

In one aspect, the TCAM matching circuit 810, the policy table storage 820, and the QNN control circuit 830 can identify a configuration setting for a particular packet attribute or a particular flow attribute. Rather than implementing a single component or a table to determine a configuration setting, implementing multiple components or tables can help improve storage and computational efficiency. For example, the reconfigurable neural network circuit 240 may support a large number of permutations (e.g., 10,000-300,000) of different configuration settings for different neural networks. Implementing a single table to store a list of such large number of configuration settings may consume a large storage resource. By implementing the TCAM matching circuit 810, the policy table storage 820, the QNN control circuit 830 and the MUX control circuit 840 as disclosed herein, each of the TCAM matching circuit 810, the policy table storage 820, the QNN control circuit 830 and the MUX control circuit 840 can be implemented with less storage resources (e.g., 100 kb). Hence, the reconfigurable neural network circuit 240 can be implemented in a small form factor.

In one aspect, the QNN parameters profile table storage 890 may include a plurality of bins, where each bin may store neural network parameters of a corresponding layer of a neural network. Examples of the neural network parameters include weights, biases, quantization parameters, a stride size, a pooling size. In one aspect, each bit may be identified by a corresponding QNN profile index 838D. For example, a first bin may store neural network parameters of a first layer of a neural network, and a second bin may store neural network parameters of a second layer of the neural network. In one aspect, the neural network parameters may be trained, such that the neural network implemented according to the neural network parameters can generate an indication of a predicted network characteristic (e.g., network anomaly, intrusion detection, predicted congestion, etc.) for an input feature data 808 or raw packet 818. The neural network parameters may be trained before the device 200 is deployed. The QNN parameters profile table storage 890 may receive QNN profile indexes 838D, and apply signals corresponding to neural network parameters (e.g., weights, bias values, activation functions) stored by bins corresponding to QNN profile indexes 838D to corresponding computational circuits 850. In some embodiments, the QNN parameters profile table storage 890 may receive different QNN profile indexes 838D every clock cycle or for every packet, and provide different signals to the set of computational circuits 850 corresponding to different neural network parameters accordingly every clock cycle or for every packet.

In some embodiments, the set of computational circuits 850 includes multiplexers 848, 870A, 870B, 870C, 852, neurons 855, 885, pooling circuits 858, and controllable delay lines 860A . . . 860C. These components may operate together to perform computations for one or more neural networks on the feature data 808 or one or more packets 818 to generate the indication 845 of the predicted network characteristic. In some embodiments, the set of computational circuits 850 includes more, fewer, or different components than shown in FIG. 8.

In one aspect, the set of computational circuits 850 includes a first portion 865 and a second portion 868 to implement, for example, two types of layers: convolutional layers (CNN) and dense layers. For example, the convolutional layers may receive the feature data 808 or one or more packets 818 and perform computations to identify spatial features in the feature data 808 or one or more packets 818. Then, the dense layers may perform computations on the identified spatial features to generate the indication 845 of the predicted network characteristic.

In one aspect, the first portion 865 of the set of computational circuits 850 includes the multiplexers 848, 870A, 870B, 852, delay lines 860A, 860B, 860C, neurons 855, and pooling circuits 858. In one example, the first portion 865 of the set of computational circuits 850 may implement convolutional layers. In some embodiments, the first portion 865 of the set of computational circuits 850 may implement other types of layers of a neural network.

In one aspect, multiplexers 852, neurons 855, and pooling circuits 858 are arranged in layers or stacks, where each layer or each stack includes a corresponding set of multiplexers 852, a corresponding set of neurons 855, and a corresponding pooling circuit 858. In some embodiments, some layer or stack may omit a pooling circuit 858. Each neuron 855 may be embodied as a multiply-and-accumulate (MAC) circuit with quantization or any reconfigurable computational circuit. Each pooling circuit 858 may be a max pooling circuit to perform a max pool function or an average pooling circuit to perform an average pooling. A set of multiplexers 852, a set of neurons 855, and a pooling circuit 858 in a layer may implement a corresponding layer of a neural network. In one aspect, the set of multiplexers 852, the set of neurons 855, and the pooling circuit 858 in a layer may be set, controlled, or configured, according to neural network parameters (e.g., weights, bias values) stored by a corresponding bin in the QNN parameters profile table storage 890. For example, each multiplexer 852 may be individually controlled or configured according to the neural network parameters to provide convolution striding. For example, each neuron 855 may perform multiplication or multiply-and-accumulate operation according to a corresponding set of weights and bias values in the neural network parameters.

In one aspect, the multiplexer 848 applies either the feature data 808 or raw data in one or more packets 818 as input, according to the MUX control signal 835 from the MUX control circuit 840. In some embodiments, the multiplexer 848 corresponds to or is implemented as the multiplexer 258. In one aspect, the multiplexer 870A can be set, controlled, or configured according to a control signal 838A from the QNN control circuit 830 to support recirculation. In one aspect, the multiplexer 870B can be set, controlled, or configured according to a control signal 838B the QNN control circuit 830 to bypass certain layers. In one aspect, the delay lines 860A . . . 860C ensure each pass can take the same number of cycles through corresponding layers of the first portion 865 of the set of computational circuits to facilitate design of the QNN control circuit 830.

In one aspect, the second portion 868 of the set of computational circuits 850 includes the multiplexer 870C and neurons 885. In one example, the second portion 868 of the set of computational circuits 850 may implement dense layers.

In one aspect, neurons 885 are arranged in layers or stacks, where each layer or each stack includes a corresponding set of neurons 885. Each neuron 885 may be embodied as a multiply-and-accumulate circuit with quantization, or any reconfigurable computational circuit. A set of neurons 885 in a layer may implement a corresponding layer of a neural network. In one aspect, the set of neurons 885 in a layer may be set, controlled, or configured, according to neural network parameters (e.g., weights, bias values) stored by a corresponding bin in the QNN parameters profile table storage 890. For example, each neuron 885 may perform multiplication or multiply-and-accumulate operation according to a corresponding set of weights, bias values in the neural network parameters.

In one aspect, the reconfigurable neural network circuit 240 can operate in a linear pipeline. The reconfigurable neural network circuit 240 can operate in a linear pipeline to perform computations for the same neural network or different neural networks. For example, the QNN control circuit 830 may provide QNN profile indexes 838D to the QNN parameters profile table storage 890 such that the QNN parameters profile table storage 890 may apply signals corresponding to first neural network parameters of a first layer of a first neural network in a first bin to a first layer (e.g., $CI_0 \ldots CI_{i-1}$) of the set of computational circuit 850 during a first clock cycle. Hence, the first layer (e.g., $CI_0 \ldots CI_{i-1}$) of the set of computational circuit 850 may perform computation for a first packet according to the first neural network parameters in the first bin during the first clock cycle. Then, the QNN control circuit 830 may provide QNN profile indexes 838D to the QNN parameters profile table storage 890 such that the QNN parameters profile table storage 890 may apply signals corresponding to second neural network parameters of a second layer of the first neural network in a second bin to a second layer (e.g., $CH_0 \ldots CH_{cO-1}$) of the set of computational circuit 850 and apply signals corresponding to third neural network parameters of a first layer of a second neural network in a third bin to the first layer (e.g., $CI_0 \ldots CI_{i-1}$) of the set of computational circuit 850 during the second clock cycle next to or subsequent to the first clock cycle. Hence, the second layer (e.g., $CH_0 \ldots CH_{cO-1}$) of the set of computational circuit 850 may perform computation based on the output of the first layer of the set of computational circuit 850 in the first clock cycle for a first packet according to the second neural network parameters of the second layer of the first neural network in the second bin during the second clock cycle, while the first layer (e.g., $CI_0 \ldots CI_{i-1}$) of the set of computational circuit 850 may perform computation for a second packet according to the third neural network parameters of the first layer of the second neural network in the third bin during the second clock cycle. By applying neural network parameters of layers of different neural networks to different layers or different subsets of the set of computational circuits 850 for each clock cycle, the reconfigurable neural network circuit 240 can perform computations for the different neural networks in pipeline for at rates of the order of billions of packets per second (Bpps), and achieve processing power in the order of trillions of operations per second (TOPS).

Figure 9:
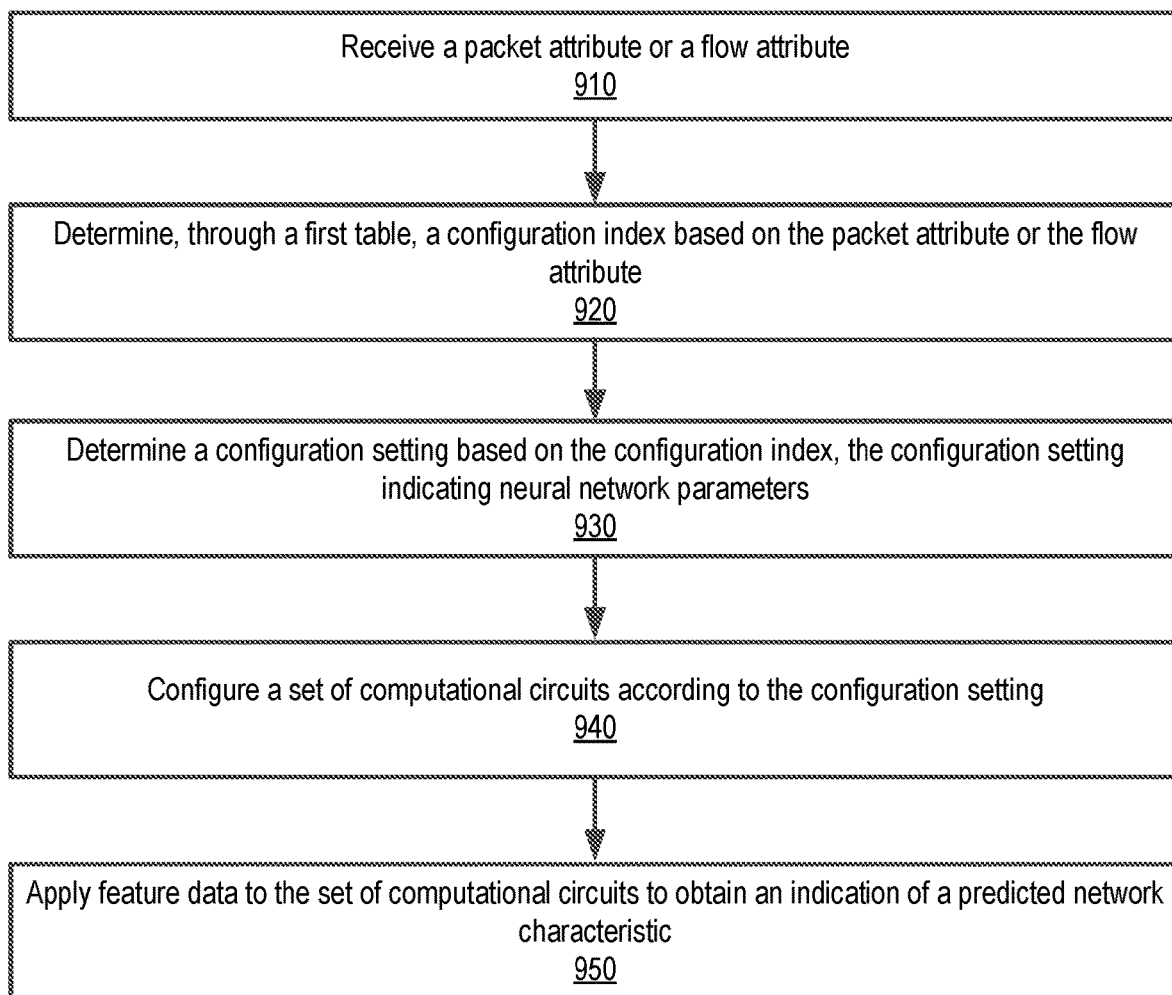
FIG. 9 illustrates a flow chart showing a process of adaptively performing computation for a neural network through a reconfigurable neural network circuit, in accordance with an embodiment.

FIG. 9 illustrates a flow chart showing a process 330 of adaptively performing computation for a neural network through a reconfigurable neural network circuit 240, in accordance with an embodiment. In one approach, the process 330 is performed by the reconfigurable neural network circuit 240. In some embodiments, the process 330 is performed by other entities. In some embodiments, the process 330 includes more, fewer, or different steps than shown in FIG. 9.

In one approach, the reconfigurable neural network circuit 240 receives 910 input attribute data 802 including a packet attribute or a flow attribute.

In one approach, the reconfigurable neural network circuit 240 determines 920, through a first table (e.g., policy table), a configuration index based on the packet attribute or the flow attribute. For example, the TCAM matching circuit 810 may determine a policy index 812 with a matching packet attribute or a flow attribute, and provide the policy index 812 to the policy table storage 820. In response to the policy index 812, the policy table stored by the storage 820 may determine, identify, or provide corresponding configuration index 828A.

In one approach, the reconfigurable neural network circuit 240 determines 930, for example through a second table (e.g., configuration table stored by the QNN control circuit 830), a first configuration setting including control signals 838A-838C and a second configuration setting including QNN profile indexes 838D based on the configuration index 828A. The first configuration setting including the control signals 838A-838C may indicate how to set, control or configure one or more components (e.g., multiplexers) of the set of computational circuits 850. The second configuration settings including QNN profile indexes 838D may indicate which neural network parameters of which neural network to apply to which layer or subset of the set of computational circuits 850.

In one approach, the reconfigurable neural network circuit 240 configures 940 the set of computational circuit 850, according to the configuration setting. For example, the QNN control circuit 830 may provide QNN profile indexes 838D to the QNN parameters profile table storage 890 to apply neural network parameters for a corresponding layer of a corresponding neural network corresponding to the QNN profile indexes 838D to a corresponding subset or layer of the set of computational circuits 850. The reconfigurable neural network circuit 240 may also set, control, or configure one or more multiplexers (e.g., 848, 870A . . . 870C) to support recirculation or bypass capabilities.

In one approach, the reconfigurable neural network circuit 240 applies 950 feature data 808 (or adjusted featured data 235, 235', 698) to the set of computational circuits to obtain an indication 845 of a predicted network characteristic. In one aspect, the reconfigurable neural network circuit 240 can be set, controlled, or configured differently for different neural networks, such that different analyses can be performed for different packets or feature data.

Figure 10:
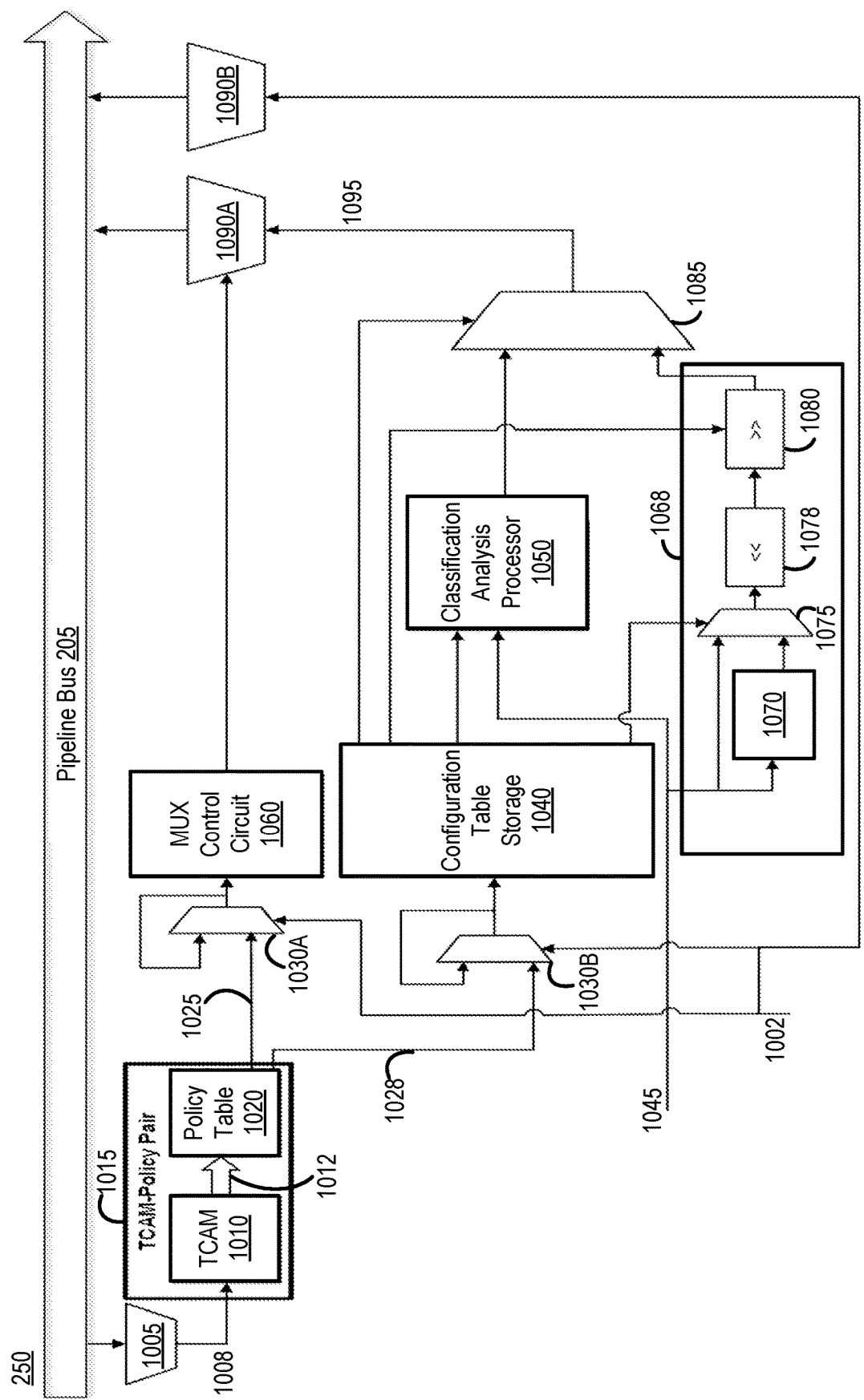
FIG. 10 illustrates a schematic diagram of an output processing circuit, in accordance with an embodiment.

FIG. 10 illustrates the output processing circuit 250, in accordance with an embodiment. In some embodiments, the output processing circuit 250 includes MUXs 1005, 1030A, 1030B, 1085, and demultiplexers 1090A, 1090B, a TCAM matching circuit 1010, a policy table storage 1020, a MUX control circuit 1060, a configuration table storage 1040, a classification analysis processor 1050, and a regression analysis processor 1068. These components may be implemented as a field programmable gate array (FPGA), application specific integrated circuit (ASIC), or any logic circuit. These component may operate together to receive the output of the reconfigurable neural network circuit 240 or an indication 1045 of a predicted network characteristic, and generate an output data 1095 indicating the predicted network characteristic. In one aspect, the indication 1045 corresponds to the indication 245 or 845, and the output data 1095 corresponds to the output data 255. In one aspect, the output processing circuit 250 generates the output data 1095 for an output of a quantized neural network. In some embodiments, the output processing circuit 250 includes more, fewer, or different components than shown in FIG. 10. In some embodiments, the TCAM matching circuit 1010, the policy table storage 1020, the MUX control circuit 1060, and the configuration table storage 1040 are embodied as a single component or a single controller.

In one aspect, the TCAM matching circuit 1010 and the policy table storage 1020 may constitute or operate as a controller 1015 or a decoder. In one aspect, the TCAM matching circuit 1010 receives input attribute data 1008 including a packet attribute or a flow attribute of a raw packet stream through the multiplexer 1005. The TCAM matching circuit 1010 may utilize the packet attribute, the flow attribute, a combination of them as a key, and perform an AND operation between the key and a mask. Then, the TCAM matching circuit 1010 may determine or search for a result of an AND operation between one of the stored values and the mask matching the result of the AND operation between the key and the mask. The TCAM matching circuit 1010 may provide a policy index 1012 associated with the value to the policy table storage 1020. The policy table storage 1020 may store a table including a list of configuration indexes for corresponding policy indexes. In some embodiments, the policy table storage 1020 is embodied as SRAM or any storage device. The policy table storage 1020 may provide a configuration index 1028 corresponding to the received policy index 1012 to the configuration table storage 1040 through the multiplexer 1030B. The policy table storage 1020 may provide a control index 1025 associated with the configuration index 1028 to the MUX control circuit 1060 through the multiplexer 1030A. In one aspect, the multiplexers 1030A, 1030B may be coupled to the QNN control circuit 830 of FIG. 8 to receive a configuration setting 1002 to support recirculation. The demultiplexer 1090B may provide the configuration setting 1002 or recirculation control to the pipeline bus 205 to notify downstream pipeline components that the reconfigurable neural network circuit 240 was unable to produce a valid indication of a predicted network characteristic on that clock cycle due to recirculation.

In one aspect, the configuration table storage 1040 may store a table including a list of configuration settings for corresponding configuration indexes. The configuration table storage 640 may be embodied as a static random access memory (SRAM) or any storage device. In some embodiments, the configuration table storage 1040 may be implemented as a controller or a decoder. The configuration table storage 1040 may provide configuration settings corresponding to the received configuration index 1028 to various components of the output processing circuit 250. The configuration settings may indicate configurations of the components (e.g., classification analysis processor 1050, the regression analysis processor 1068, etc.) of the output processing circuit 250. In one aspect, the configuration settings indicate or correspond to a type (e.g., application classification, network anomaly detection, network intrusion detection, predicted congestion, or a configuration value for a traffic manager to improve a QoS, etc.) of output data 1095.

In one aspect, the TCAM matching circuit 1010, the policy table storage 1020, and the configuration table storage 1040 can identify a configuration setting for a particular packet attribute or a particular flow attribute. Rather than implementing a single component or a table to determine a configuration setting, implementing multiple components or tables can help improve storage and computational efficiency. For example, the output processing circuit 250 may support a large number of permutations (e.g., 10,000-300,000) of different configuration settings. Implementing a single table to store a list of such large number of configuration settings may consume a large storage resource. By implementing the TCAM matching circuit 1010, the policy table storage 1020, and the configuration table storage 1040 as disclosed herein, each of the TCAM matching circuit 1010, the policy table storage 1020, and the configuration table storage 1040 can be implemented with less storage resources (e.g., 100 kb). Hence, the output processing circuit 250 can be implemented in a small form factor.

In one aspect, the output of the reconfigurable neural network circuit 240 or an indication 1045 of a predicted network characteristic can be processed by the classification analysis processor 1050 or the regression analysis processor 1068. The classification analysis processor 1050 may use the indication 1045 of a predicted network characteristic to compute a one-hot decision vector for a multi label or multi class classification problem, where the regression analysis processor 1068 may use the indication 1045 of a predicted network characteristic to predict a value for a multivariate regression problem. A classification analysis may involve converting the indication 1045 or the neural network output into one bit decision value (e.g., one-hot classification/decision vector). For example, the classification analysis processor 1050 may compare the indication 1045 or the neural network output against a threshold value as indicated by the configuration setting from the configuration table storage 1040, and generate one bit indication according to the comparison (e.g., higher than the threshold or lower than the threshold). In some embodiments, the regression analysis processor 1068 includes a casting circuit 1070, a multiplexer 1075, a left shifter 1078, and a right shifter 1080. A regression analysis may involve casting the indication 1045 by the casting circuit 1070 from a signed to an unsigned integer. The output of the casting circuit 1070 may be scaled or adjusted by the shifters 1078, 1080. The multiplexer 1075 may be implemented to bypass the casting circuit 1070. The multiplexer 1085 may select the output of the regression analysis processor 1068 or the output of the classification analysis processor 1050, and provide the selected output to the pipeline bus 205 as the output data 1095 through the demultiplexer 1090A.

In one aspect, the output processing circuit 250 interprets an indication of a predicted network characteristic as the solution to a regression problem or a classification problem. Classification problems may include both multi-class and multi-label classification problem. For regression problems, the output processing circuit 250 may optionally cast the output from a signed to an unsigned integer and then shift by a pre-programmed value which can then be driven out on a global bus. For classification problems, the raw output for each QNN output layer (DO) neuron can be converted to a 1b decision, thereby forming a decision vector, which can then be driven out on the pipeline bus 205. Neurons in the output layer can be separated into groups. For each group, the hardware may set the output to 1 for a neuron if it has the highest activation value of all the neurons in that group as long as it is above a pre-programmed threshold or a confidence threshold and otherwise may set the output to 0. The pre-programmed threshold or the confidence threshold may be changed for application or flows based on the tolerance for false positive or false negative. If two neurons have the same raw activation value, a static priority may be enforced and the neuron with the lower index may be set to 1 while the other neuron is set to 0. The maximum number of neuron groups possible may be equal to the number of neurons provisioned in hardware for the output layer of the QNN. Generally for multi-class classification networks, neurons belonging to the same network may be placed in the same group, whereas for multi label classification problems, neurons from the same network may be placed into separate groups with one neuron present in each group.

In one aspect, the output data 1095 may be employed for various network applications. For example, the output data 1095 can be utilized for application classification. In one example, network characteristics of one or more packets can be obtained to determine or identify whether the one or more packets are for video streaming, email, browsing websites, etc. For example, the output data 1095 can be utilized for intrusion detection. In one example, network characteristics of one or more packets can be obtained to determine different types of DoS attacks. For example, the output data 1095 can be utilized for congestion prediction. In one example, network characteristics of one or more packets can be obtained to determine certain traffic patterns, which may be indicative of near term congestion in the traffic manager.

Figure 11:
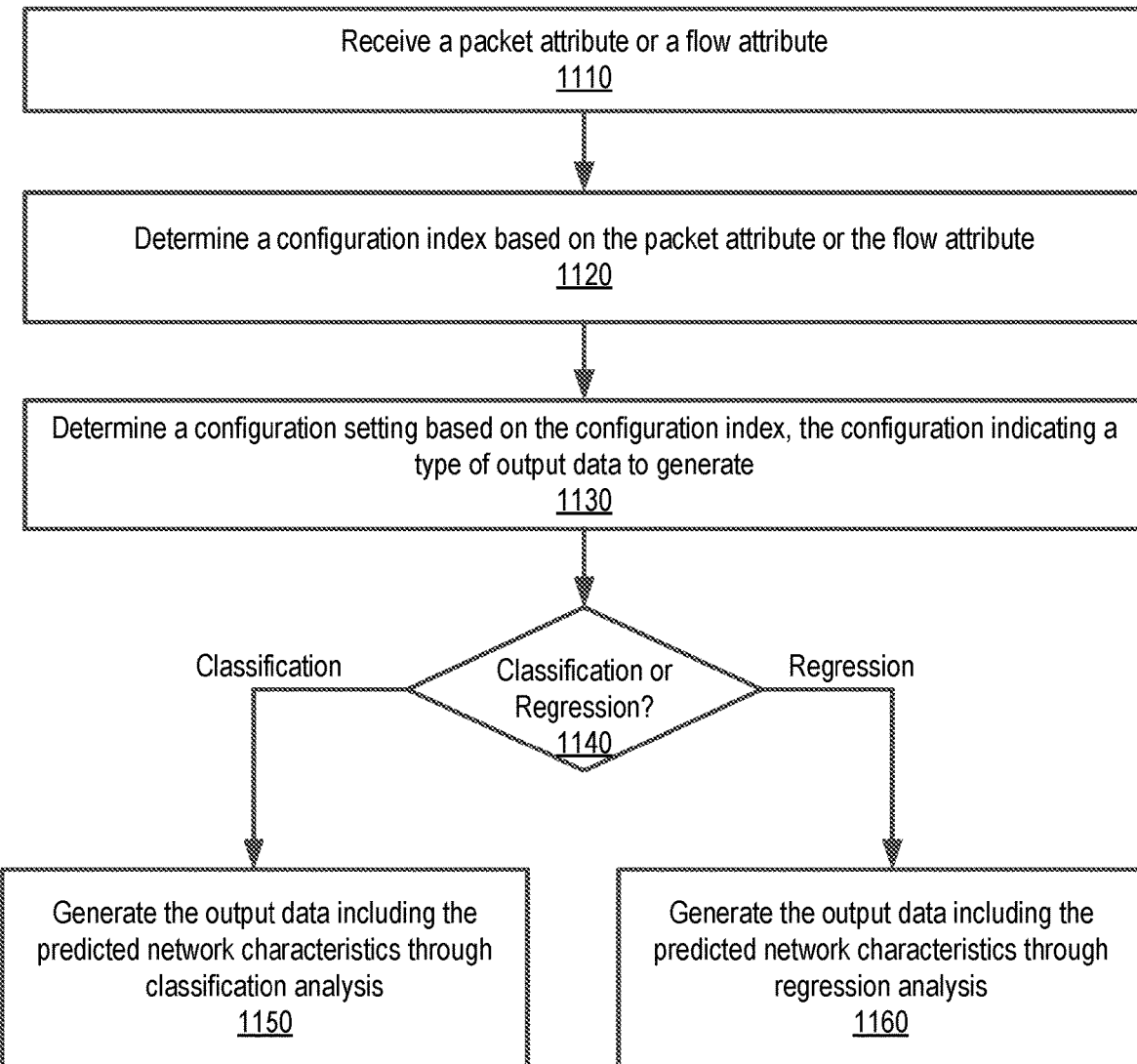
FIG. 11 illustrates a flow chart showing a process of adaptively generating output data including a predicted network characteristic, in accordance with an embodiment.

FIG. 11 illustrates a flow chart showing a process 340 of adaptively generating output data 1095 (or output data 255) including a predicted network characteristic, in accordance with an embodiment. In some embodiments, the process 340 is performed by the output processing circuit 250. In some embodiments, the process 340 is performed by other entities. In some embodiments, the process 340 includes more, fewer, or different steps than shown in FIG. 11.

In one approach, the output processing circuit 250 receives 1110 input attribute data 1008 including a packet attribute or a flow attribute.

In one approach, the output processing circuit 250 determines 1120, through a first table (e.g., policy table), a configuration index based on the packet attribute or the flow attribute. For example, the TCAM matching circuit 1010 may determine a policy index with a matching packet attribute or a flow attribute, and provide the policy index to the policy table storage 1020. In response to the policy index, the policy table stored by the storage 1020 may determine, identify, or provide a corresponding configuration index 1028.

In one approach, the output processing circuit 1030 determines 1130, through a second table (e.g., configuration table stored by the storage 1040), a configuration setting based on the configuration index 1028. The configuration setting may indicate configurations of various circuits or components of the output processing circuit 1030 (e.g., the classification analysis processor 1050, the shifters 1078, 1080, the multiplexers 1075, 1085, etc.). In one aspect, the configuration settings may indicate or correspond to a type (e.g., application classification, network anomaly detection, network intrusion detection, predicted congestion, or a configuration value for a traffic manager to improve QoS, etc.) of output data 1095.

In one approach, the output processing circuit 1030 determines 1140 whether to perform a classification analysis or a regression analysis. For example, the configuration table storage 1040 determines whether to perform a classification analysis or a regression analysis according to the configuration index through the table stored by the configuration table storage 1040, and determines or obtains configuration settings for configuring the classification analysis processor 1050, or the regression analysis processor 1068.

In response to determining to apply the classification analysis, the classification analysis processor 1050 may generate 1150 the output data 1095 through the classification. The classification analysis processor 1050 may use the indication 1045 of a predicted network characteristic to compute a one-hot decision vector for a multi label or multi class classification problem. In response to determining to apply the regression analysis, the regression analysis processor 1068 may generate 1160 the output data 1095 through the regression analysis. For example, the regression analysis processor 1068 may use the indication 1045 of a predicted network characteristic to predict a value for a multivariate regression problem. The multiplexer 1085 may select the output of the regression or the classification, and provide the selected output to the pipeline bus 205 as the output data 1095 through the demultiplexer 1090A.

In one aspect, by implementing TCAM matching circuits, the profile table storages or policy table storage, and configuration table storages for different components (e.g., feature computation circuit 220, input processing circuit 230, reconfigurable neural network circuit 240, output processing circuit 250) can help the device implement a large number of quantized neural networks to obtain a large number of statistical features and compute a large number of predicted network characteristics in an efficient manner. For example, the device 200 may support a large number of permutations (e.g., over millions) of different configuration settings for different components (e.g., feature computation circuit 220, input processing circuit 230, reconfigurable neural network circuit 240, output processing circuit 250), where each component (e.g., feature computation circuit 220, input processing circuit 230, reconfigurable neural network circuit 240, output processing circuit 250) may implement a set of storage devices with less storage resources (e.g., 100 kb each). Hence, the device 400 can achieve area efficiency while supporting a large number of varying computations for different neural networks.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A network device comprising:
   a reconfigurable neural network circuit configured to determine an indication of a predicted network characteristic, the reconfigurable neural network circuit including:
      a control circuit configured to:
         select a packet attribute or a flow attribute of a raw packet stream received by the network device, wherein the packet attribute or the flow attribute comprises an attribute identified from one of a header or a field of one or more packets of the raw packet stream, and
         determine a configuration setting, corresponding to the packet attribute or the flow attribute, the configuration setting indicating a configuration of the reconfigurable neural network circuit to implement a neural network of the reconfigurable neural network to perform computations on packets of the raw packet stream received by the network device having the packet attribute or the flow attribute,
      a storage device configured to provide neural network parameters of the neural network to reconfigure the reconfigurable neural network, according to the configuration setting, and
      a set of computational circuits configured to perform computations on the packets of the raw packet stream received by the network device having the packet attribute or the flow attribute based on the neural network parameters from the storage to determine the indication of the predicted network characteristic.

2. The network device of claim 1, wherein the set of computational circuits implements a quantized feedforward neural network.

3. The network device of claim 1, wherein the set of computational circuits operates in a linear feedforward pipeline.

4. The network device of claim 1, wherein the control circuit includes:
   a first control circuit including:
      a matching circuit configured to determine an index according to the packet attribute or the flow attribute of the raw packet stream, and
      another storage device storing a table of a set of configuration settings, the another storage device configured to provide the configuration setting corresponding to the index; and
   a second control circuit configured to control a set of multiplexers of the set of computational circuits, according to the configuration setting.

5. The network device of claim 1,
   wherein the control circuit is configured to determine the configuration setting corresponding to the packet attribute or the flow attribute of a first packet of the raw packet stream during a first clock cycle; and
   wherein the control circuit is configured to determine another configuration setting corresponding to a packet attribute or a flow attribute of a second packet of the raw packet stream during a second clock cycle subsequent to the first clock cycle, the another configuration setting indicating another configuration of the reconfigurable neural network circuit to implement another neural network.

6. The network device of claim 5,
   wherein the set of computational circuits includes a first layer of computational circuits and a second layer of computational circuits,
   wherein the storage device is further configured to provide a first set of neural network parameters of the neural network to the first layer of computational circuits during a third clock cycle, according to the configuration setting, and
   wherein the storage device is further configured to provide a second set of neural network parameters of the neural network to the second layer of computational circuits during a fourth clock cycle subsequent to the third clock cycle, according to the configuration setting, while providing a third set of neural network parameters of the another neural network to the first layer of computational circuits, according to the another configuration setting.

7. The network device of claim 1, wherein the set of computational circuits includes:
   a first set of layers of computational circuits corresponding to convolution layers and pooling layers, and
   a second set of layers of computational circuits corresponding to dense layers.

8. The network device of claim 7, wherein the reconfigurable neural network circuit further includes:
   a multiplexer configured to selectively bypass the first set of layers of computational circuits, according to the configuration setting.

9. The network device of claim 1, wherein the set of computational circuits includes:
   a first layer of computational circuits corresponding to a first layer of the neural network,
   a second layer of computational circuits corresponding to a second layer of the neural network, and a multiplexer configured to selectively provide outputs of the second layer of computational circuits to inputs of the first layer of computational circuits, according to the configuration setting.

10. The network device of claim 1, wherein the set of computational circuits includes:
a set of multiplexers coupled to inputs of a layer of computational circuits, the set of multiplexers configured to provide convolution striding, according to the configuration setting.

11. The network device of claim 1, further comprising:
an input processing circuit including:
a matching circuit configured to determine an index according to the packet attribute or the flow attribute of the raw packet stream, wherein the packet attribute or the flow attributes comprises an attribute identified from one of a header or a field of one or more packets of the raw packet stream, and
another storage device storing a table of a set of configuration settings, the another storage device configured to provide another configuration setting corresponding to the index, the another configuration setting indicating parameters for performing scaling, and
a scaling circuit configured to:
receive feature data corresponding to one or more statistical features of the raw packet stream, the feature data having a first range of values,
adjust the feature data to generate an adjusted feature data having a second range of values, according to the another configuration setting, and
provide the adjusted feature data to the reconfigurable neural network circuit.

12. The network device of claim 11, wherein the scaling circuit includes:
a shift circuit,
a masking circuit,
an adder circuit, and
a clamping circuit,
wherein the shift circuit, the masking circuit, the adder circuit, and the clamping circuit generate the adjusted feature data having the second range of values, according to the another configuration setting.

13. The network device of claim 11, wherein the another configuration setting indicates a configured value for performing imputation, wherein the input processing circuit includes:
an imputation circuit configured to:
detect an invalid value in the feature data, and
substitute the invalid value with the configured value.

14. The network device of claim 1, further comprising:
an output processing circuit including:
a matching circuit configured to determine an index according to the packet attribute or the flow attribute of the raw packet stream;
another storage device storing a table of a set of configuration settings, the another storage device configured to provide another configuration setting corresponding to the index, the another configuration setting indicating a type of output data;
a classification analysis processor configured to determine a first candidate predicted network characteristic based on the indication according to the another configuration setting;
a regression analysis processor configured to determine a second candidate predicted network characteristic based on the indication according to the another configuration setting; and
a multiplexer configured to select one of the first candidate predicted network characteristic or the second candidate predicted network characteristic as the predicted network characteristic of the determined type, according to the another configuration setting.

15. A network device comprising:
an input processing circuit configured to:
determine a configuration setting according to a packet attribute or a flow attribute of a packet of a raw packet stream received by a network device, wherein the packet attribute or the flow attribute comprises an attribute identified from one of a header or a field of one or more packets of the raw packet stream, and
scale, according to the configuration setting, a feature data including one or more statistical features of the raw packet stream to generate an adjusted feature data; and
a reconfigurable neural network circuit configured to perform computations corresponding to a neural network on the adjusted feature data to determine an indication of a predicted network characteristic,
wherein the input processing circuit is implemented as a linear pipeline with the reconfigurable network circuit to perform computations on packets of the raw packet stream received by the network device having the packet attribute or the flow attribute.

16. The network device of claim 15, wherein the input processing circuit includes:
a matching circuit configured to determine an index according to the packet attribute or the flow attribute of the raw packet stream, and
a storage device storing a table of a set of configuration settings, the storage device configured to provide the configuration setting corresponding to the index, the configuration setting indicating parameters for performing scaling or an assigned value for performing imputation, and
a scaling and imputation circuit configured to perform scaling and imputation on the feature data to generate the adjusted feature data, according to the configuration setting.

17. The network device of claim 15, wherein the neural network is a quantized neural network.

18. A network device comprising:
a reconfigurable neural network circuit configured to perform computations on packets of a raw packet stream received by the network device having a packet attribute or a flow attribute corresponding to a neural network to determine an indication of a predicted network characteristic according to the packet attribute or the flow attribute of a packet of the raw packet stream received by the network device, wherein the packet attribute or the flow attribute comprises an attribute identified from one of a header or a field of one or more packets of the raw packet stream; and
an output processing circuit including:
a control circuit configured to determine a configuration setting of the reconfigurable neural network to perform computations on packets of the raw packet stream received by the network device corresponding to the packet attribute or the flow attribute of the packet of the raw packet stream, and one or more processing circuits configured to generate output data including predicted network characteristic based on the indication according to the configuration setting and the packets of the raw packet stream received by the network device having the packet attribute or the flow attribute.

19. The network device of claim 18, wherein the output processing circuit is configured to generate the output data indicating the predicted network characteristic including:
   a network intrusion,
   an associated application of the raw packet stream,
   a predicted network congestion, or
   a target configuration of a traffic manager.

20. The network device of claim 18, wherein the neural network is a quantized neural network.

* * * * *